United States Patent
Balasubramanian et al.

(10) Patent No.: US 12,219,554 B2
(45) Date of Patent: Feb. 4, 2025

(54) METHODS AND APPARATUS FOR UPLINK ENERGY HARVESTING AND SIGNALING

(71) Applicant: InterDigital Patent Holdings, Inc., Wilmington, DE (US)

(72) Inventors: Anantharaman Balasubramanian, San Diego, CA (US); Hussain Elkotby, Conshohocken, PA (US); Marian Rudolf, Montreal (CA); Tanbir Haque, Jackson Heights, NY (US); Patrick Cabrol, Bayshore, NY (US); Ravikumar Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 537 days.

(21) Appl. No.: 17/610,396

(22) PCT Filed: May 16, 2020

(86) PCT No.: PCT/US2020/033305
§ 371 (c)(1),
(2) Date: Nov. 10, 2021

(87) PCT Pub. No.: WO2020/236664
PCT Pub. Date: Nov. 26, 2020

(65) Prior Publication Data
US 2022/0248432 A1    Aug. 4, 2022

Related U.S. Application Data

(60) Provisional application No. 62/849,400, filed on May 17, 2019.

(51) Int. Cl.
*H04W 72/1268* (2023.01)

(52) U.S. Cl.
CPC ................. *H04W 72/1268* (2013.01)

(58) Field of Classification Search
CPC ............. H04W 72/1268; H04W 16/28; H04W 72/0446; H04W 72/0453; H04W 72/23;
(Continued)

(56) References Cited

U.S. PATENT DOCUMENTS

| | | |
|---|---|---|
| 9,980,295 B2 | 5/2018 | Pelletier et al. |
| 9,986,541 B2 | 5/2018 | Shin et al. |

(Continued)

FOREIGN PATENT DOCUMENTS

| | | |
|---|---|---|
| CN | 104081709 A | 10/2014 |
| CN | 104168098 A | 11/2014 |

(Continued)

OTHER PUBLICATIONS

Nguyen, Thien D et al, "An Adaptive MAC Protocol for RF Energy Harvesting Wireless Sensor Networks", IEEE, Dec. 4, 2016, 6 pages.

(Continued)

*Primary Examiner* — Ayaz R Sheikh
*Assistant Examiner* — Tarell A Hampton
(74) *Attorney, Agent, or Firm* — Volpe Koenig

(57) ABSTRACT

Method and apparatus for a WTRU to harvest energy from uplink signals of other WTRUs in a wireless network are disclosed. In an example, a method includes sending a message indicating resources and capability of energy harvesting (EH) from sets of resources of the plurality of resources; receiving one or more SRS super-sets, each SRS super-set being associated with a group of other WTRUs and at least one set of resources of the plurality of resources; determining a mapping between a receive beam and an SRS super-set; receiving uplink transmission patterns each being associated with an SRS super-set; selecting a receive beam (Continued)

from a set of receive beams based on the received uplink transmission patterns; and harvesting RF energy from uplink transmissions of one or more groups of other WTRUs using at least the selected receive beam and the received uplink transmission patterns.

20 Claims, 21 Drawing Sheets

(58) Field of Classification Search
CPC ... H04L 5/0094; H04L 5/0051; H04L 5/0053; H02J 50/40; H02J 50/80; H02J 2310/22; H02J 50/20; H02J 50/001
See application file for complete search history.

(56) References Cited

U.S. PATENT DOCUMENTS

| | | | |
|---|---|---|---|
| 10,382,978 B2 | 8/2019 | Lee et al. | |
| 2015/0303741 A1* | 10/2015 | Malik | H02J 50/001 307/104 |
| 2016/0112078 A1* | 4/2016 | Ju | H02J 50/20 370/278 |
| 2017/0214567 A1* | 7/2017 | Salkintzis | H04W 52/34 |
| 2018/0109150 A1* | 4/2018 | Khan | H02J 50/20 |
| 2018/0139081 A1* | 5/2018 | Guvenkaya | H04L 25/03828 |
| 2019/0274155 A1* | 9/2019 | Bhattad | H04L 5/0073 |
| 2020/0169122 A1* | 5/2020 | Prakriya | H01M 10/46 |
| 2020/0221426 A1 | 7/2020 | Lee et al. | |
| 2020/0314752 A1 | 10/2020 | Haque et al. | |
| 2022/0045722 A1* | 2/2022 | Chen | H04L 5/0053 |
| 2022/0070766 A1* | 3/2022 | Haque | H04W 52/0209 |
| 2022/0070775 A1* | 3/2022 | Elkotby | H04W 52/0229 |
| 2022/0070836 A1* | 3/2022 | Balasubramanian | H02J 50/001 |
| 2022/0078779 A1* | 3/2022 | Xu | H04W 72/20 |

FOREIGN PATENT DOCUMENTS

| | | |
|---|---|---|
| CN | 104186010 A | 12/2014 |
| CN | 104956606 A | 9/2015 |
| WO | WO 2018204282 A1 | 11/2018 |
| WO | WO 2018207206 A1 | 11/2018 |
| WO | WO 2019005712 A1 | 1/2019 |
| WO | WO 2020131813 A1 | 6/2020 |

OTHER PUBLICATIONS

Lohani, Sudha et al, "Downlink Power Allocation for Wireless Information and Energy Transfer in Macrocell-Small Cell Networks", 2016 IEEE Wireless Communications and Networking Conference, IEEE, Apr. 3, 2016, 6 pages.

Wu, Tianqing et al, "RF Energy Harvesting with Cooperative Beam Selection for Wireless Sensors", IEEE Wireless Communications Letters, IEEE, vol. 3, No. 6, Dec. 1, 2014, pp. 585-588.

* cited by examiner

Aggregate User 1 and User 2 Slot Format and Allocated Frequency Resources

Downlink Symbol     Flexible Symbol

Uplink Symbol     Allocated Frequency Resources

METHODS AND APPARATUS FOR UPLINK ENERGY HARVESTING AND SIGNALING

CROSS-REFERENCE TO RELATED APPLICATIONS

This application claims the benefit, under 35 U.S.C. § 371 of International Application PCT/US2020/033305, filed May 16, 2020, which claims the benefit of U.S. Provisional Application No. 62/849,400 filed in the U.S. Patent and Trademark Office on May 17, 2019, which is incorporated herein by reference in its entirety.

SUMMARY

Embodiments disclosed herein generally relate to methods and apparatus for energy harvesting and signaling in wireless communications. For example, methods and apparatus for a wireless transmit/receive unit (WTRU) to harvest energy from uplink signals of other WTRUs in a wireless network.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Representative Communications Network

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
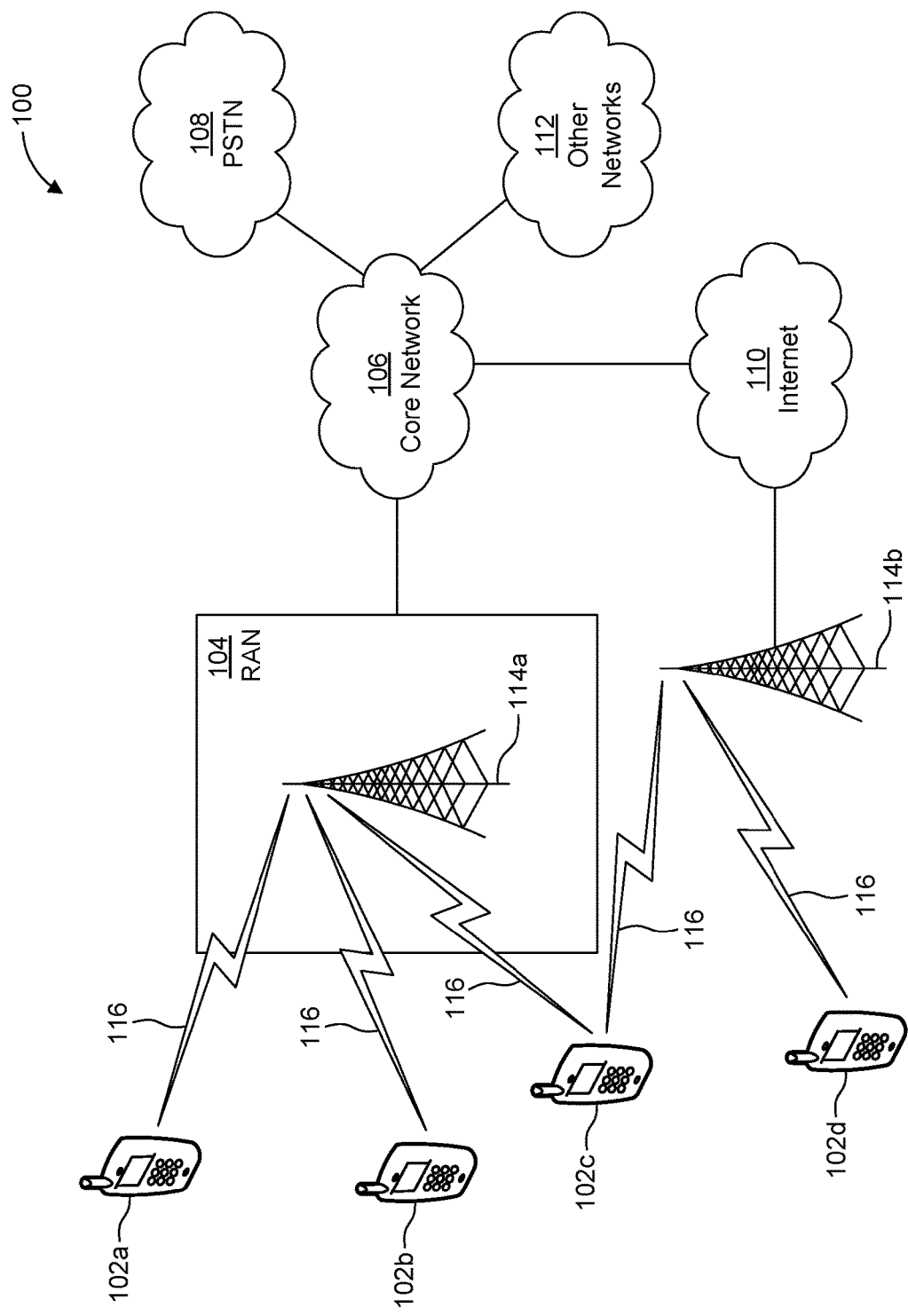
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
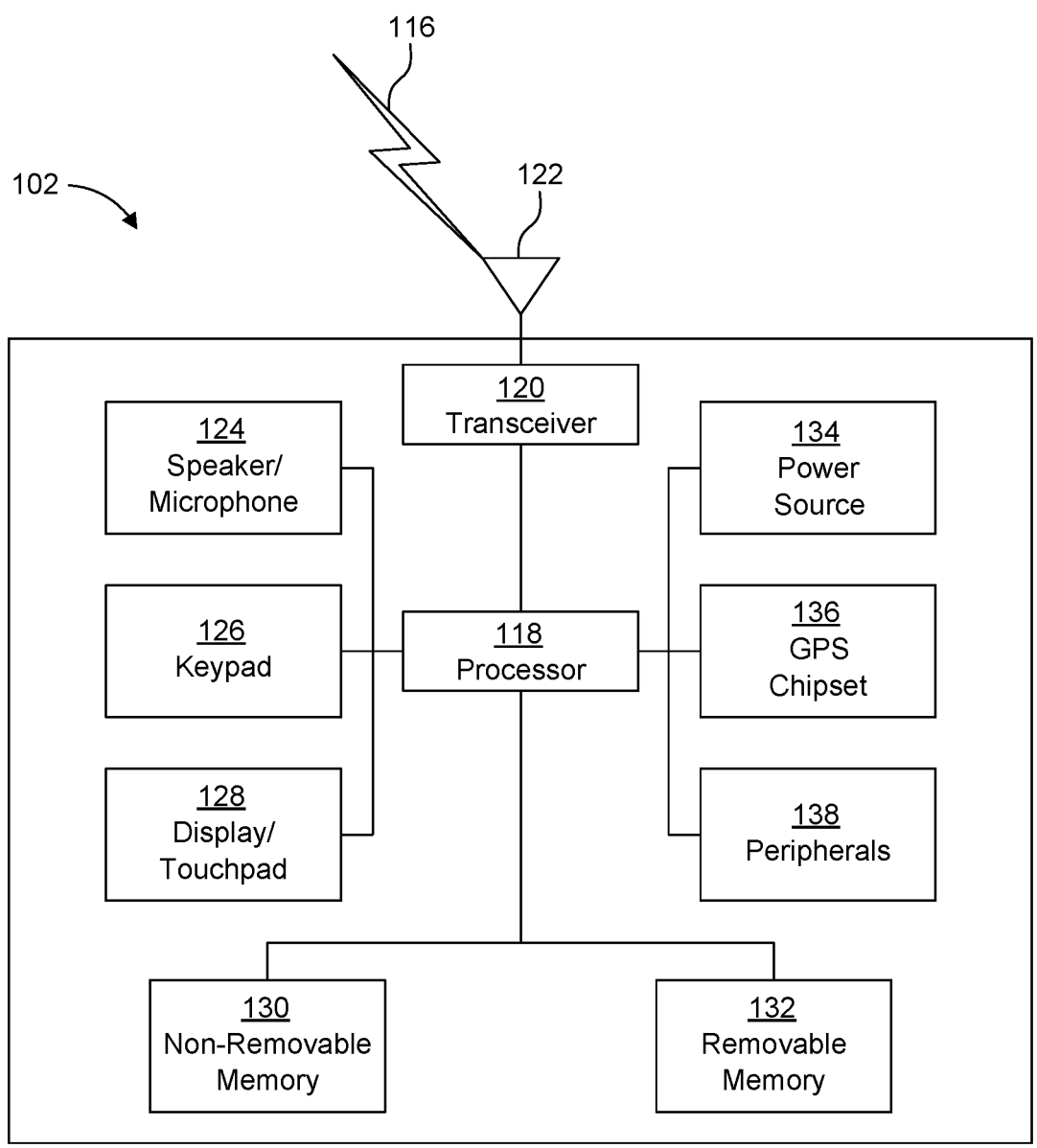
FIG. 1B is a system diagram illustrating an example of a wireless transmit/receive unit (WTRU) that may be used within the communications system illustrated in FIG. 1A according to an embodiment.
Figure 1C:
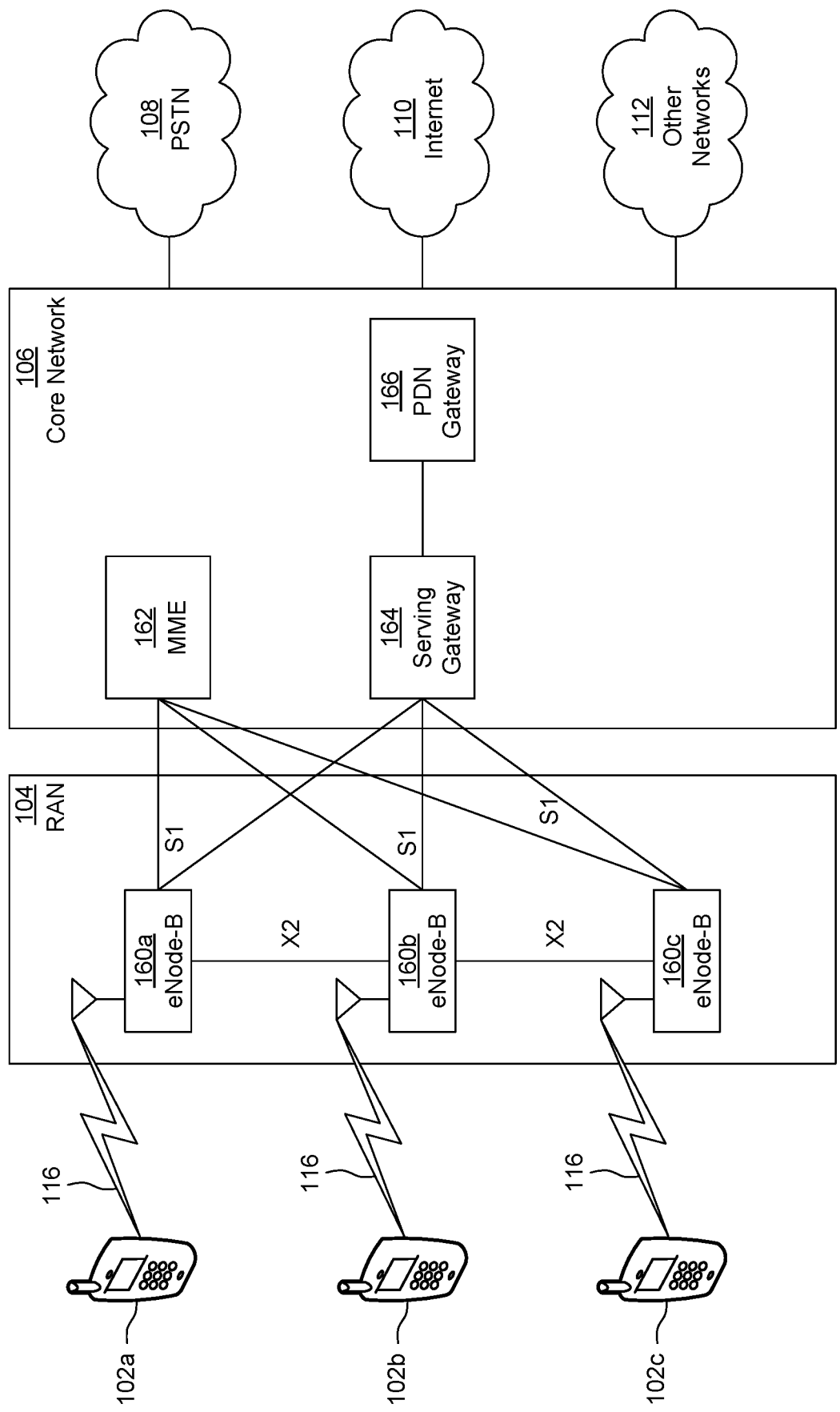
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
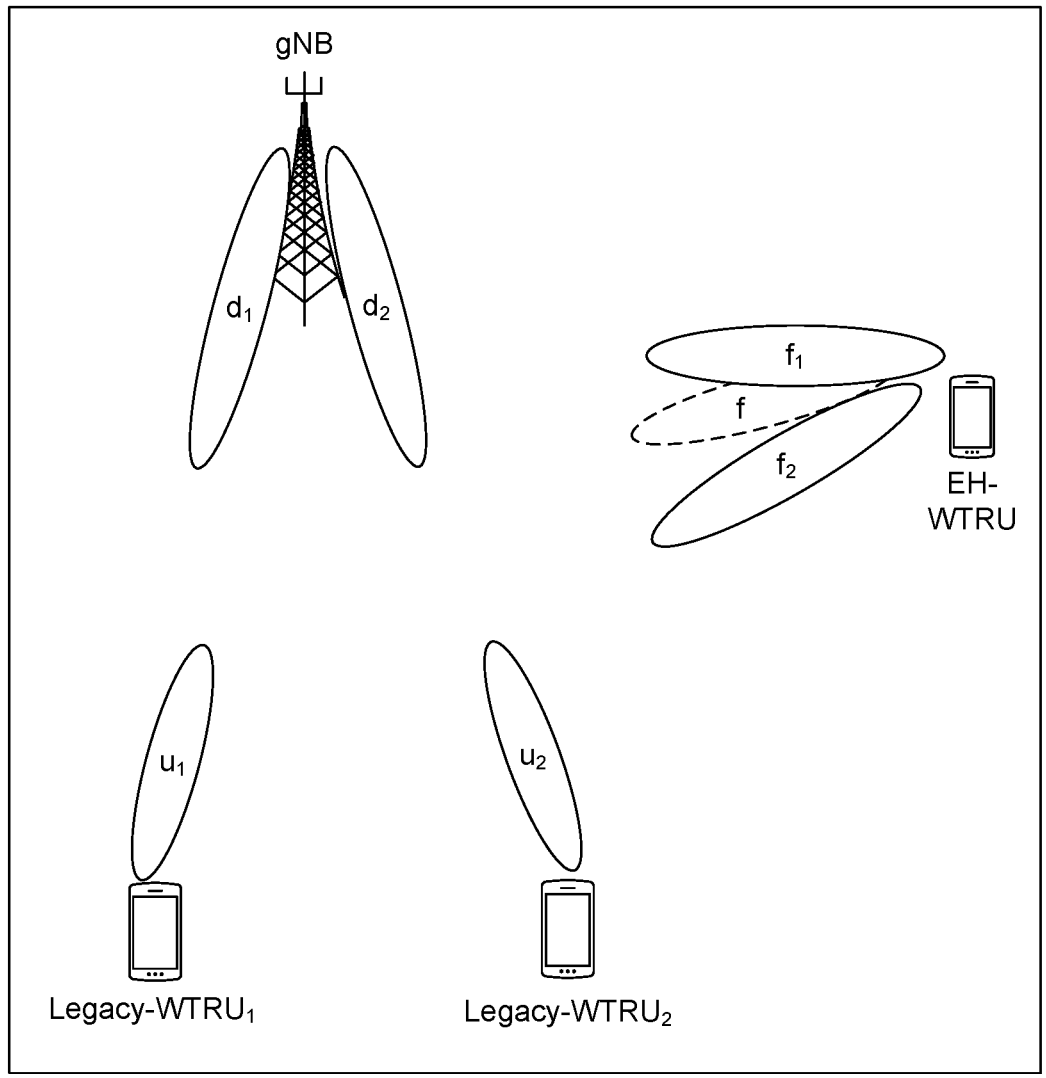
FIG. 10 is a diagram illustrating training-based energy harvesting beam acquisition for a multi user scenario in accordance with an embodiment.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country.

Figure 1D:
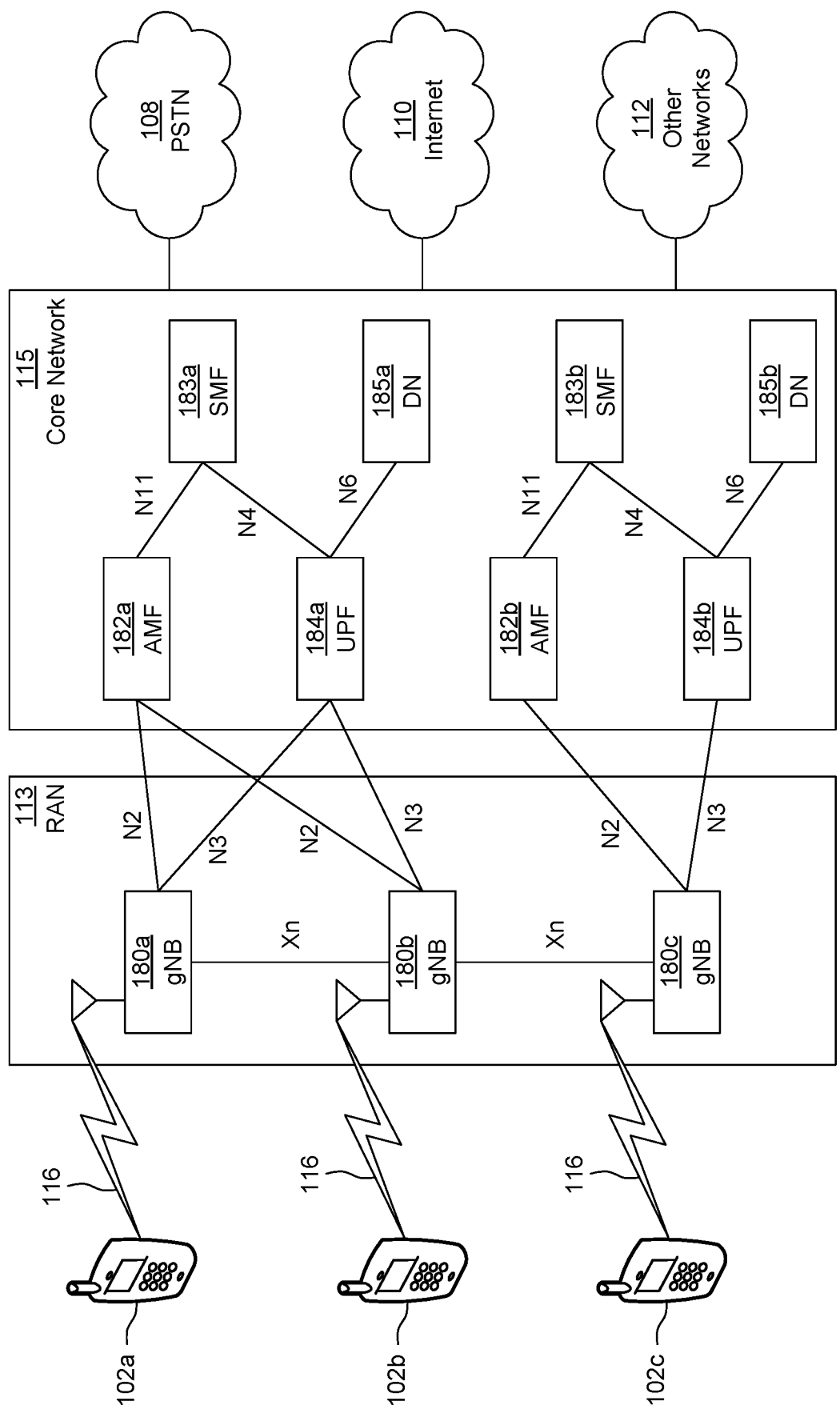
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Representative Procedures for Energy Harvesting

In state-of-the-art wireless technology such as cellular and WLAN, RF front ends are usually a mix of passive and active components. For example, passive components include Rx antennas, Tx/Rx path switches and filters. These components require little, if any, power to function. On the other hand, active components require power in order to function. For example, the oscillator to tune to the carrier frequency, the low noise amplifier and the analog to digital (ND) converters in the Rx path are active components (see, e.g., Refs [1] and [2]).

Advances in RF component design over the past several years have made it possible to use novel types of RF circuitry that can process received RF waveforms, which are collected through the antenna front-end by the receiving device, to harvest energy from the received RF waveforms for use in powering circuitry in the absence of an active power supply. For example, such a device may harvest energy from the received RF waveform with reasonable efficiency to store it (e.g., in a battery, capacitor, or other energy storage device) for subsequent use cases or may use it directly to run the necessary circuitry to process received signals. These passive receivers use RF components such as Schottky diodes or micro-mechanical systems (MEMS) RF transformers to implement the functionality required for voltage amplification, multiplication, and signal rectification. Passive receivers may operate in the antenna far-field and may support reasonable link budgets. In the following discussion, the terms passive receiver, energy harvesting (EH) device, and zero-energy (ZE) receiver may be used interchangeably.

Figure 2:
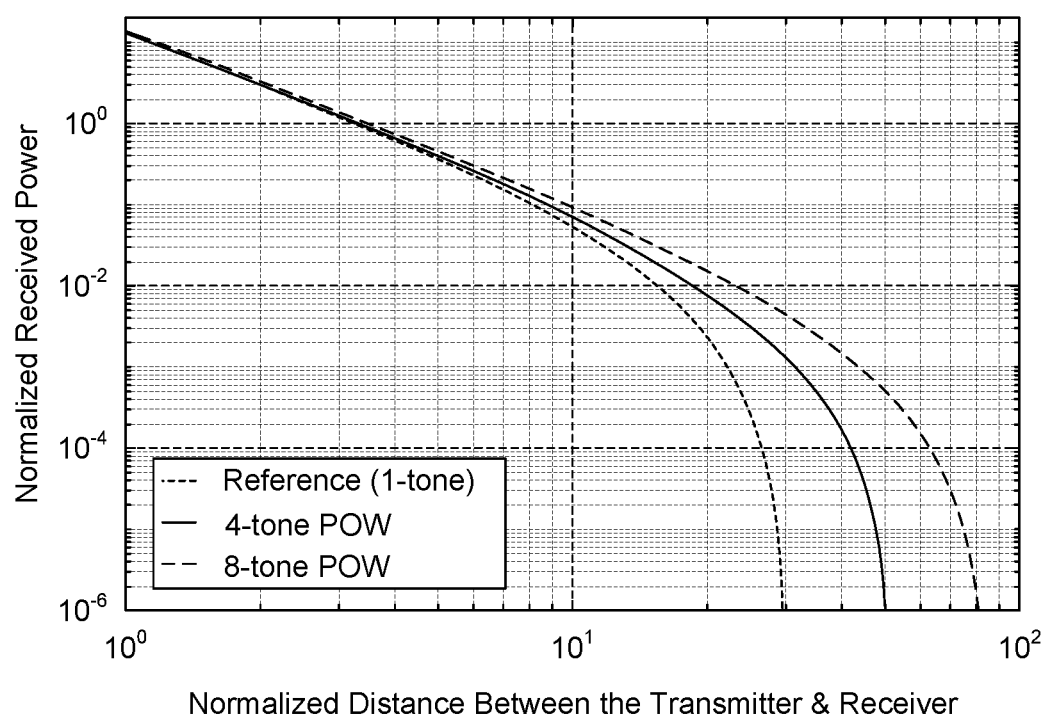
FIG. 2 is a graph showing exemplary power received by a rectification diode-based energy harvesting device as a function of distance and waveform FIG. 3A a is a graph showing exemplary conversion efficiencies of a rectification diode-based device as a function of received power and waveform.

Operational range and energy harvesting efficiency are important characteristics of a passive receiver. The power received by a rectification diode-based energy harvesting device as a function of distance, with respect to the EH signal transmitter, and type of transmitted waveform is illustrated in FIG. 2. It is seen that, for a desired received power level, the operational distance may be optimized by properly selecting the number of tones for a power optimized waveform (POW).

Figure 3A:
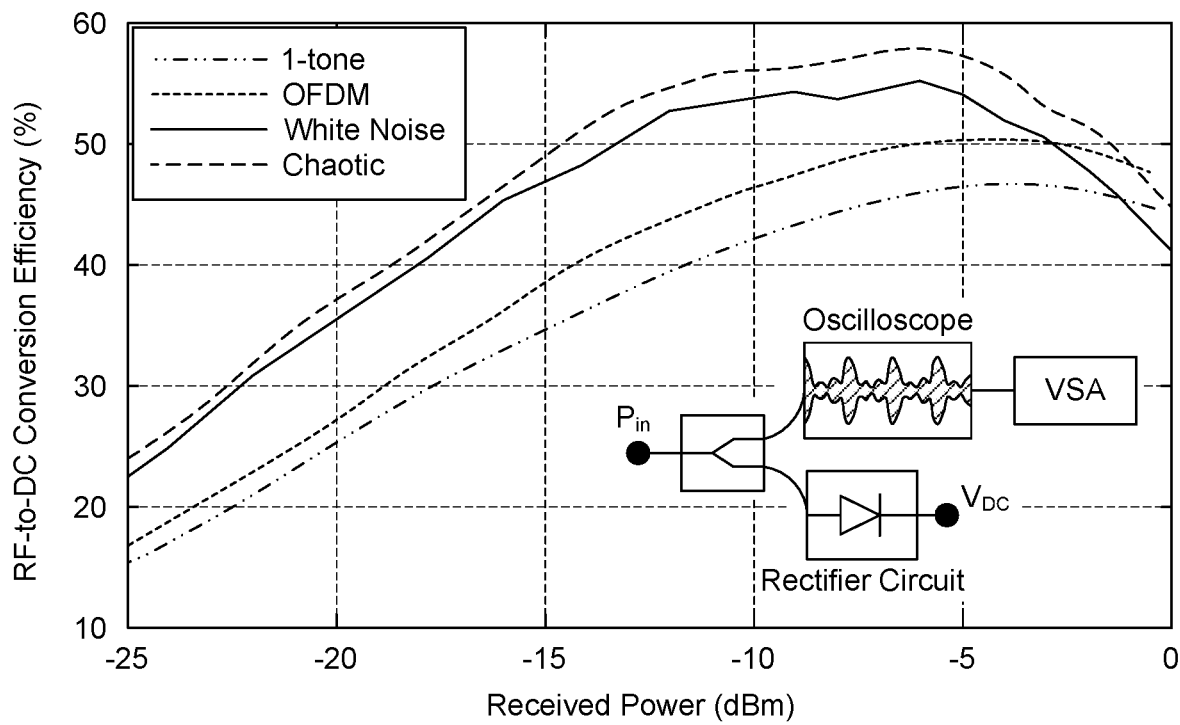
FIG. 3B a is a graph showing an exemplary peak to average power ratio (PAPR) of a rectification diode-based device as a function of Complementary Cumulative Distribution Function (CCDF) of the envelope of a test signal.
Figure 3B:
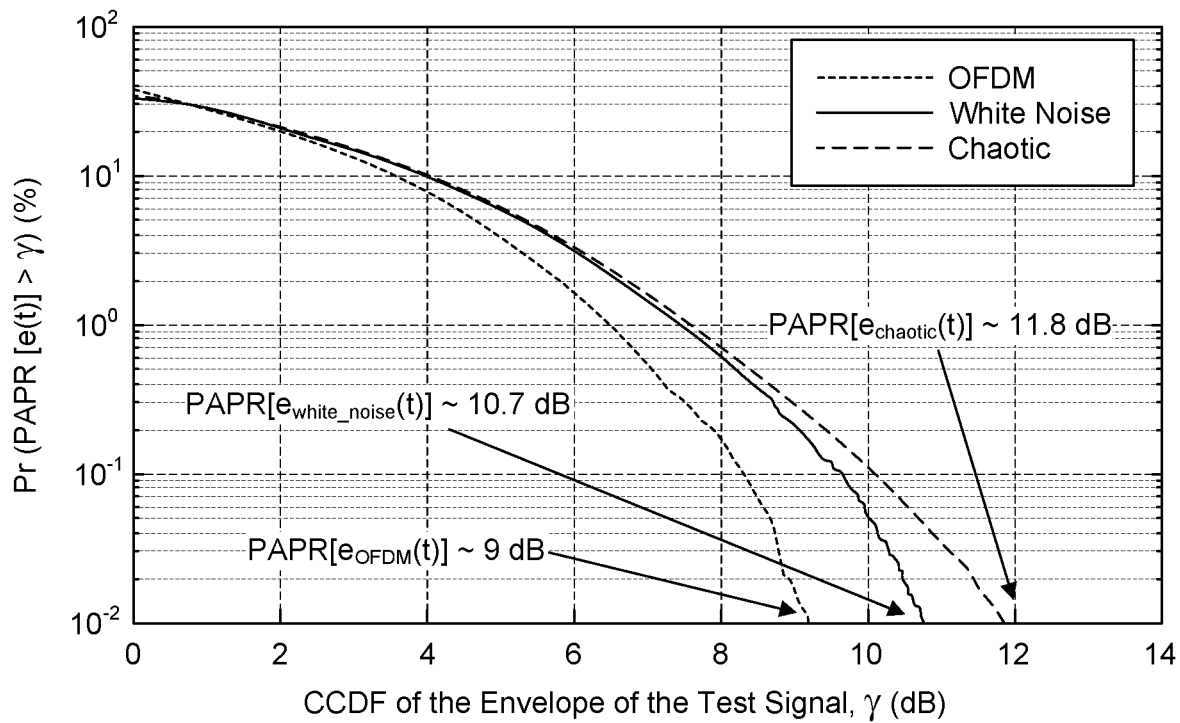

The efficiency of a rectification diode-based energy harvesting receiver as a function of the received signal power and the type of received signal is illustrated in FIG. 3A. It is seen in FIG. 3A that the highest level of RF-to-DC conversion efficiency is achieved with a chaotic signal. The Peak to Average Power Ratio (PAPR) of various test signals as a function of Complementary Cumulative Distribution Function (CCDF) of the envelope of the test signal is shown in FIG. 3B. It can be seen that a chaotic signal delivers the highest PAPR.

Figure 4C:
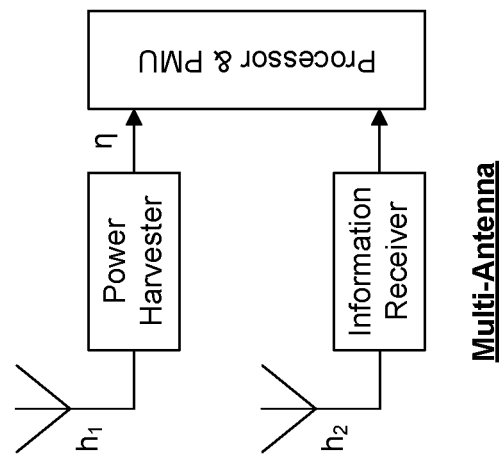
FIGS. 4A, 4B, and 4C are block diagrams showing three potential configurations of a receiver of an energy harvesting device.
Figure 4B:
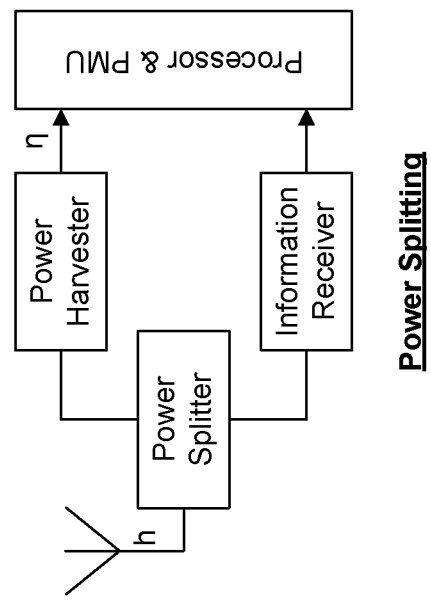
Figure 4A:
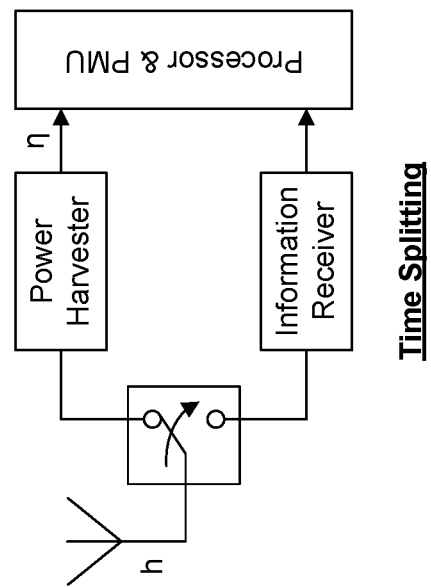

FIGS. 4A, 4B, and 4C, respectively, illustrate three different receiver configurations for receiving an information-bearing signal and retrieving the information from the signal while also harvesting energy from the signal. Note that the information reception requirement of an information receiver that is collocated with an energy harvesting device may be satisfied by an appropriate power split (FIG. 4A), time split (FIG. 4B), or antenna separation (FIG. 4C).

With the expected proliferation of IoT (Internet of Things) devices and envisioned applications that will require their deployment in the environment or in hard to reach places, it is infeasible to assume the applicability of the conventional battery recharging/replacement methods for powering such devices. It might also be cost and time inefficient to replace such devices. Therefore, energy harvesting is expected to become an indispensable feature supported by many IoT devices. The support of this feature can also be extended to other types of wireless devices, such as wearables, for the purpose of battery life extension and/or to alleviate the burden of frequent conventional battery recharging or replacement.

The amount of IoT WTRU device deployment is expected to reach very large numbers in the coming years. A natural question to ask is whether one can leverage this massive scale transmission of such devices to harvest energy. Disclosed herein are various methods, apparatus, and systems whereby an energy harvesting device harvests energy by tapping into uplink transmissions from one or more legacy WTRU/IoT devices. Note that the term "legacy WTRU" and its like is used herein to refer to any WTRU from which an energy harvesting WTRU harvests energy, and is not intended to imply that the "legacy WTRU" itself may not be another energy-harvesting-capable WTRU. Furthermore, as used herein, a WTRU may be a device that has only receive capabilities, has only transmit capabilities, or has both transmit and receive capabilities. For instance, it is presumed that many IoT devices may be only transmit devices or only receive devices.

The following are some characteristics of uplink energy harvesting. Although the maximum power transmission capability of a WTRU typically is much less than a gNB, the Power Spectral Density (PSD) of a WTRU uplink transmission commonly can be expected to be much higher than that of a gNB, as the bandwidth over which a WTRU transmits is typically much narrower than that of a gNB. Even if the PSD of a WTRU uplink transmission is less, the scale of uplink WTRU transmissions can be leveraged possibly over a larger bandwidth to harvest energy. Some of the many issues concerning uplink energy harvesting in wireless networks include methods for EH-WTRUs to harvest energy from legacy WTRU uplink transmissions without network assistance; and methods for enabling EH-WTRUs to harvest energy from uplink transmissions of legacy WTRUs with network assistance (particularly, methods by which networks can play a role in enabling coexistence of EH-WTRUs in cellular deployments).

In various embodiments, methods described herein may be suited for WTRU dense scenarios, such as music and sporting events or inside malls, airports, and other public venues with sufficient/extreme UL traffic conditions.

In various embodiments, methods described herein may be categorized into three categories: 1) methods or procedures whereby an EH-WTRU listens to the downlink transmissions of legacy WTRUs to autonomously infer energy harvesting opportunities; 2) methods or procedures whereby the network provides minimal assistance to the EH-WTRU to enable it to determine energy harvesting opportunities; and 3) methods or procedures whereby the network provides full assistance to the EH-WTRU with regard to energy harvesting.

In various embodiments, the following definitions may be used in this disclosure:
- Legacy WTRU: a device connected to the network for information exchange and traditional communication purposes, but does not provide support for other devices to perform energy harvesting, and may or may not support energy harvesting itself;
- A PRB Set: a group of physical resource blocks defined statically or dynamically by the network and that may or may not be contiguous in frequency;
- SRS Super-Set: a set that represents the aggregation of multiple WTRUs' sounding reference signal (SRS) resource sets, where each SRS resource set may or may not overlap in frequency and/or time with another SRS resource set within the SRS super-set.

Representative Procedures for Autonomous Energy Harvesting Schedule Determination:

Cell Specific Schedule Patterns

In various embodiments, the energy harvesting device listens to the cell specific schedule pattern transmitted as a part of system information/higher layer signaling to infer the uplink transmission pattern to be used by the legacy WTRUs. The energy harvesting (EH) WTRU behavior may be as follows. For example, the EH WTRU may switch on receive circuitry of the EH WTRU during the sub-frame/slots/symbols during which there is an uplink transmission, and may or may not switch off the receive circuitry during the downlink transmission in order to conserve energy. During the sub-frame/timeslots/symbols during which the schedule is 'flexible', the EH device, may deterministically or randomly (according to some distribution) switch its receiver circuitry on or off.

Slot Format Indication for Group of Devices.

In various embodiments, the EH device may listen to the dynamically signaled slot format indication (SFI) provided to a group of devices transmitted as part of the Downlink Control Information (DCI). The EH device behavior may be as follows. For example, the EH device receives the Group Radio Network Temporary Identifier (GRNTI) corresponding to the device group for which the SFI is meant through higher layer dedicated signaling/RRC (e.g., connection setup, etc.), MAC signaling, etc. Using the GRNTI, the EH device decodes the control channel to infer the slot format indication. Based on the SFI, the EH WTRU may switch on its receive circuitry during the sub-frame/slots/symbols during which there is an uplink transmission, and may or may not switch off the receive circuitry during the downlink transmissions in order to conserve energy. During the sub-frame/timeslots/symbols during which the schedule is 'flexible', the EH device may, deterministically or randomly (according to some distribution), switch on or switch off its receive circuitry.

Geography (Zone) Based Schedule Pattern Within a Cell

In various embodiments, to maximize the energy harvesting efficiency (e.g., defined by energy harvested in time interval [0, T] as a ratio of energy spent in [0, T] by switching on its receiver circuitry), it is advantageous to harvest energy from closer, rather than farther, WTRUs. This necessitates knowing the Slot Format Indication (SFI) of nearby WTRUs, or, more generally, WTRUs in a defined (sub) geographical area. A cell may be divided into one or more (sub) geographical areas, each identified by a unique geographical RNTI (geo-RNTI). The EH WTRU uses one or more appropriate geo-RNTIs based on its location. The EH WTRU operation may be as follows.

For example, the EH WTRU receives, through system information or dedicated signaling, a mapping between (sub) geographical areas and their unique geo-RNTIs. Alternatively, an EH WTRU may determine the geo-RNTI based on a pre-configured mapping based on its current geo-location—for example, a mapping between latitude/longitude vs geo-RNTI(s).

Figure 5:
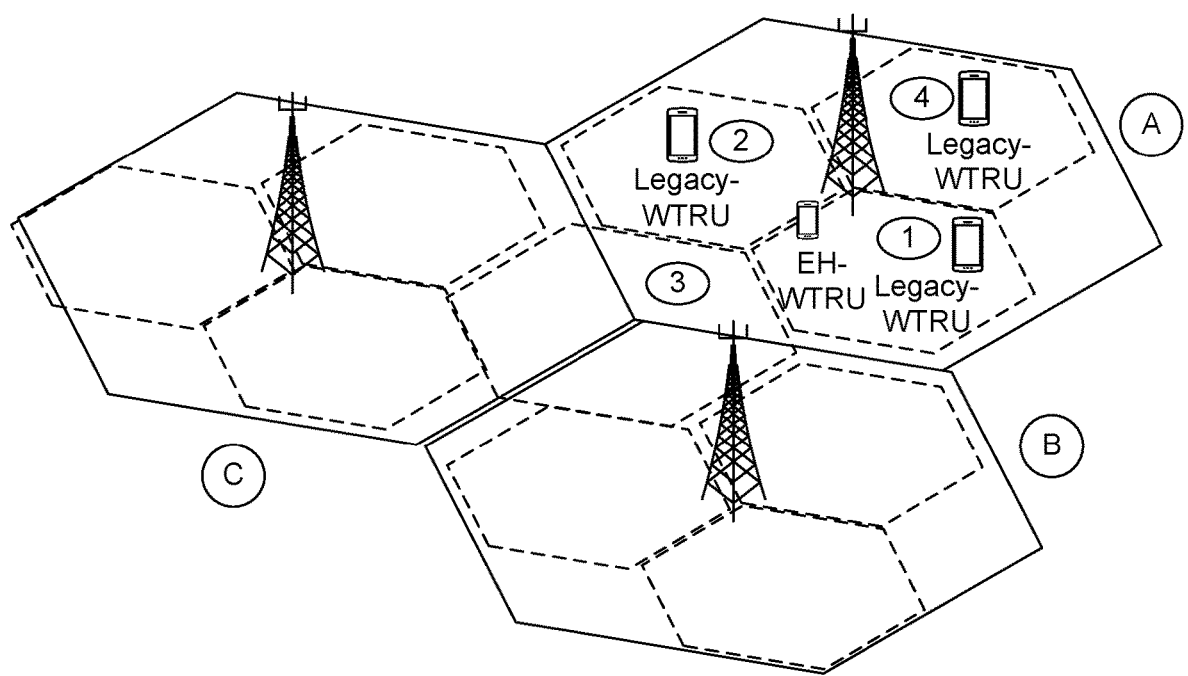
FIG. 5 is a diagram illustrating geography-based schedule pattern determination in a cell of a cellular communication network.

In various embodiments, the EH WTRU may determine its location and choose any of the following. a) A unique geo-RNTI corresponding to its location. For instance, referring to FIG. 5, the EH WTRU in (sub) geography-1 may elect to attempt energy harvesting with respect to only legacy WTRUs in the geo-RNTI corresponding to (sub) geography-1; and/or b) The geo-RNTI corresponding to its location plus the geo-RNTI(s) of one or more adjoining locations. Referring again to FIG. 5, the EH WTRU, which is at the edge of (sub) geography-1, may elect to attempt energy harvesting with respect to legacy WTRU's in the geo-RNTI corresponding to not only (sub) geography-1, but also (sub) geographies-2, 3 and 4 in order to know the slot schedule in adjoining geo-RNTIs to maximize energy harvesting.

In various embodiments, using the determined one or more geo-RNTIs, the EH WTRU decodes the slot schedules for one or more (sub) geographies. Let, g_RNTI(i) denote the geo-RNTI of (sub) geography-i. The EH WTRU may decode the slot schedule ss(i) using g_RNTI(i). The resulting slot format, $ss_{eh}$, that the EH-WTRU follows is given by:

$$ss_{eh} = \bigcup_i ss(i)$$

Based on the resulting slot format ($ss_{eh}$), the EH WTRU switches on its receive circuitry during the sub-frame/slots/symbols during which there are uplink transmissions, and may or may not switch off the receive circuitry during the downlink transmission in order to conserve energy. During the sub-frame/timeslots/symbols that the schedule is 'flexible', the EH device may, deterministically or randomly (according to some distribution), switch on or switch off its receive circuitry.

Energy Harvesting Schedule Determination with Minimal Assistance from gNB

In various embodiments, methods may refer to a network access point as the gNB. However, it will be understood that this is merely exemplary and that the network access point could take other forms, such as an eNB or other forms of base stations, etc.

Aggregation of Uplink Grants/Schedules of Legacy WTRU in a Cell/(Sub)Geography:

In various embodiments, the EH WTRU may receive WTRU-specific signaling (MAC/RRC), or common (e.g., group based) signaling that indicates the uplink grants (time/frequency resources) of one or more WTRUs in a cell, or (sub) geography, that might be in the form of (a) an initial PRB index and range of PRBs, (b) an initial PRB set index and range of PRB sets, (c) one or more indices of PRBs/PRB sub-sets/PRB sets, etc.

Figure 6A:
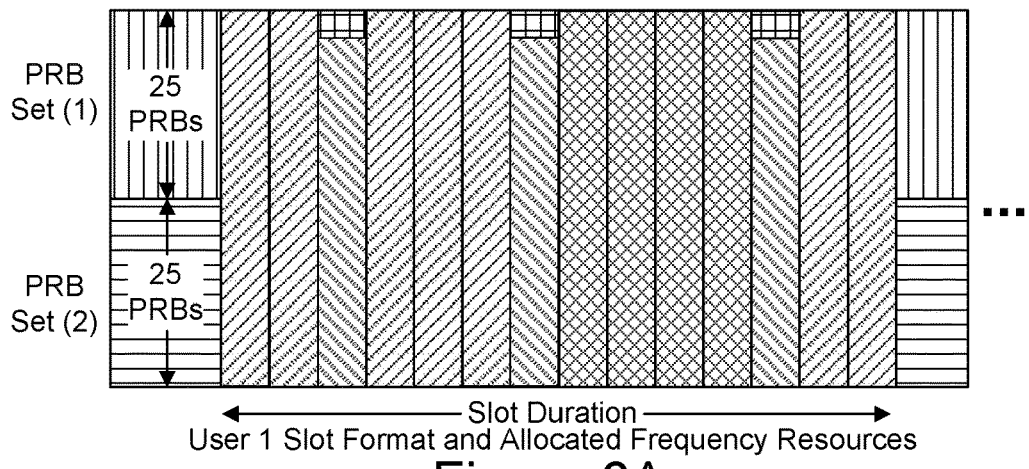
FIGS. 6A, 6B, and 6C are diagrams showing three exemplary time and frequency resource aggregation schemes for energy harvesting purposes.
Figure 6B:
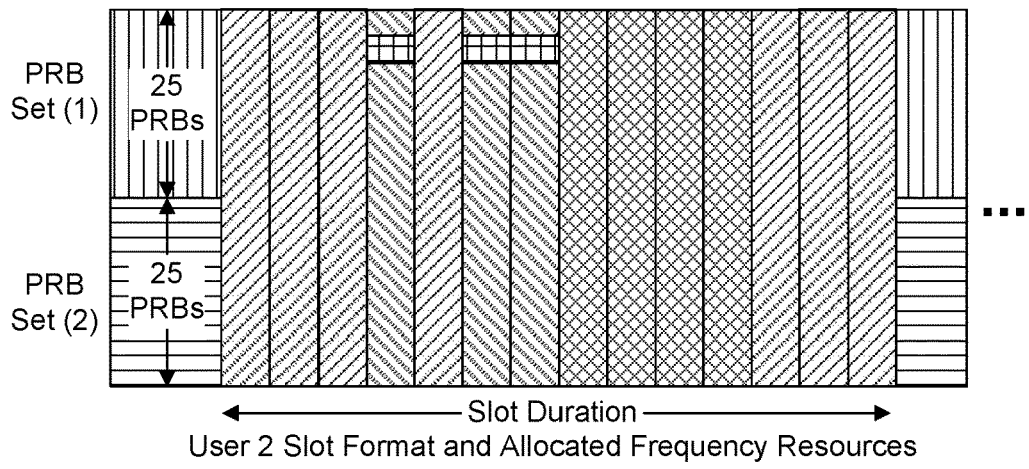
Figure 6C:
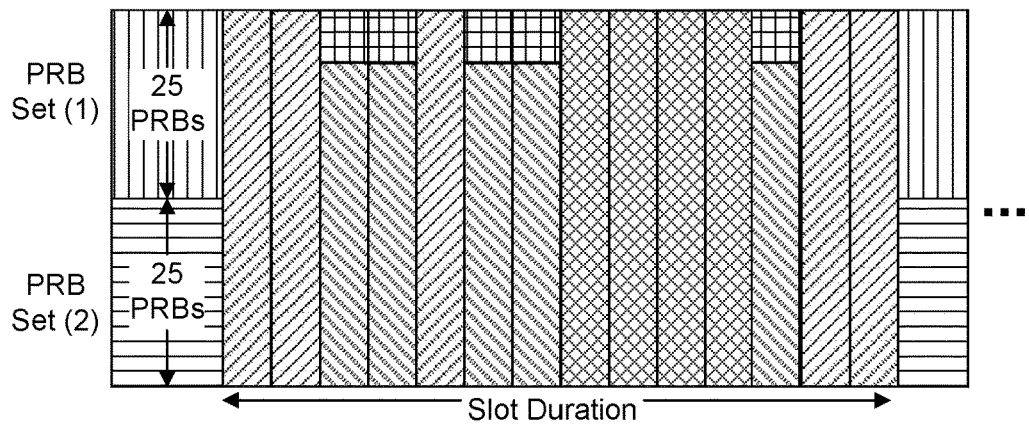
Figure 6C:
Figure 6C:
Figure 6C:
Figure 6C:

In this embodiment, the gNB behavior may be as follows. For example, the gNB may select (e.g., based on geography) all or a subset of users (e.g., legacy WTRUs) in a cell that are going to be scheduled during a time period. Let $(t_i, f_i)$ be the scheduling format for $user_i$. That is, $t_i$ represents the schedule in the time domain, and $f_i$ in the frequency domain. As an example, $t_i$=[DDUDDDUFFFFUDD] denotes that legacy WTRU-i is scheduled on symbols 3, 7, 12 in the uplink, while D, F represents the downlink and flexible slots, respectively. $f_i$ represents the set of resource blocks/subcarriers assigned to $user_i$ per symbol, or group of symbols. The gNB could get an aggregated view of all the time/frequency resources of the legacy WTRUs that are to be scheduled, simply by $$t = \bigcup_i t_i \text{ and } f = \bigcup_i f_i$$

which can then be mapped to one or more PRB sets, or a subset of a single PRB set. For example, considering a system with 50 PRBs, PRB sets can be defined such that each 25 contiguous PRBs are part of a set (however, note that the mapping does not necessarily have to be contiguous). Referring now to FIGS. 6A-6C, let us assume two users are scheduled for information/data transmission such that time and PRB resources are defined, for user 1, as $t_1$=[DDUDDDUFFFFUDD], $f_1 \in \{1,2\}$ (FIG. 6A) and, for user 2, as [DDDUDUUFFFFDDD], $f_1 \in \{3,4\}$ (FIG. 6B). Then, the gNB determines the aggregate schedule for the purpose of energy harvesting as t=[DDUUDUUFFFFUDD], $f \in \{1,2,3,4\}$ and maps frequency resources to the first PRB set as shown in FIG. 6C. As another example, PRB sets could be defined such that there are 5 PRB sets and the first PRB set contains PRBs with indices$\in \{1,2,3,4,5,26,27,28,29,30\}$ using one indexing, i.e., each PRB set contains two discontiguous sets of 5 contiguous PRBs interleaved with 20 PRBs from the other four PRB sets. The gNB transmits (t, f) determined above to the EH WTRU via system information (e.g., that is applicable to EH WTRUs), MAC, and/or RRC signaling.

In various embodiments, the EH WTRU may receive a UE-dedicated control message over PDCCH using its unique Cell RNTI (C-RNTI), in the case of EH WTRU specific, or a UE-group control message using its Group RINTI (GRNTI), in the case of EH WTRUs group specific, that includes the (t, f) assistance information from the gNB. Alternately, there also could be a dedicated RRC message to the EH WTRU. Based on the received scheduling format (t, f) and potentially the PRB set(s) index(indices), the EH WTRU may switch on its receive circuitry for the sub-frame/slots/symbols during which there is an uplink transmission (specified by t), and for a bandwidth specified by (f), and may or may not switch off the receive circuitry during the downlink transmission in order to conserve energy. For the sub-frame/timeslots/symbols during which the schedule is 'Flexible', the EH device may, deterministically or randomly (according to some distribution), switch on or switch off its receive circuitry.

In various embodiments, the EH WTRU may receive the aforementioned assistance information pertaining to groups of one or more symbols, slots, subframes, frames, hyper-frames, super hyperframes, etc.

Aggregation of SRS Schedules/SRS Resource Sets of Legacy WTRUs in a Cell/(Sub)Geography The EH WTRU may receive WTRU specific signaling (MAC/RRC) or common (e.g., group-based) signaling that indicates the sounding reference signals (SRS) time/frequency resources, of one or more WTRUs in a cell or (sub) geography. As there could be periodic, semi-persistent, and aperiodic modes of SRS operation, energy can be harvested simultaneously from periodic SRS schedules as well as uplink grants (the aggregate SRS schedule also can be used for EH receive beam training, as will be explained in other embodiments of this application below).

In the case of periodic SRS, the gNB could select all or a subset of users in a cell (e.g., based on geography) that have SRS scheduled for a period of time. Let $p_i$ denote the periodicity with which a legacy $UE_i$ is scheduled with SRS. In order to maximize the energy harvesting ability of the EH WTRU, the gNB may calculate the resulting periodicity of all users in the cell (or in a sub-geography of the cell) to be $p=GCD_i p_i$, where GCD denotes the greatest common divisor. Although the GCD of periodicity of all users would maximize the energy harvesting capability of an EH-WTRU, the energy harvesting efficiency could suffer. For example, for two users with SRS periodicities $p_1$=15 ms and $p_2$=20 ms, respectively, the GCD periodicity would be p=5 ms. The resulting aggregate periodicity will allow the EH UE to capture SRS transmissions from both users, but, at the same time, it will try to harvest energy at instances when neither of the two users' SRSs are scheduled. Alternately, the gNB could calculate the aggregated periodicity to be any function of the configured periodicity of SRS of multiple users, e.g., least common multiple (LCM), maximum, minimum etc., Similarly, the SRS super-set is the aggregated frequency SRS resource set of all the users under consideration, i.e., the union of the configured SRS resource sets of all relevant individual users.

In the case of semi-persistent SRS configured to users in a cell, the aggregated resource set and periodicity may be calculated similarly to the procedure explained above. However, based on when the gNB schedules/will schedule the SRS transmissions for one or more legacy users (e.g., using MAC-CE), the gNB can preconfigure or indicate semi-dynamically to the EH-WTRU the time/SRS super-set on which to harvest energy.

In the case of aperiodic SRS, depending on when one or more legacy WTRUs are scheduled/will be scheduled (using DCI), the gNB can preconfigure or indicate semi-dynamically the relevant SRS resources to the EH-WTRU using MAC/RRC signaling.

One or more of the cell common SRS configurations, including srs-BandwidthConfig IE, srs-SubframeConfig IE, pSRS-offset IE as well as one or more of the cell dedicated SRS configurations, including srs-Bandwidth IE, transmissionComb IE, TSRS that is used for the purpose of legacy WTRU channel estimation/quality may be signaled to the EH-WTRU (TSRS refers to the SRS periodicity and inferable by IE srs-ConfigIndex). The device-specific SRS configuration for the purpose of estimating UL channel quality with one or more of the following information in IE soundingRS-UL-ConfigDedicated: srs-ConfigIndex, cyclicShift, transmissionComb, freqDomainPosition, srs-HoppingBandwidth, srsDuration, that the gNB uses for legacy WTRU is also signaled to the EH-WTRU. Alternately, device-specific SRS configuration information as described above may be aggregated for several legacy WTRUs and signaled to the EH-WTRU in the form of an SRS super-set(s) index(indices). This enables the EH-WTRU to listen to the SRSs transmitted by the legacy WTRUs using the signaled (aggregated/individual) SRS configuration and perform energy harvesting.

Energy Harvesting Schedule Determination with Full Assistance from gNB

Statistics of Legacy WTRU Occupancy & Their Scheduling Information Near the EH WTRU The gNB may determine the location of the EH WTRU by using well-known 3GPP standardized positioning methods. With the EH WTRU as center and for different radii, the gNB may provide the following information to the EH WTRU: number of legacy WTRUs operating in each region, as shown in FIG. 7, and the aggregated scheduling information (e.g., the aggregated time and frequency resources occupied by all legacy WTRUs in the considered radius).

Figure 7:
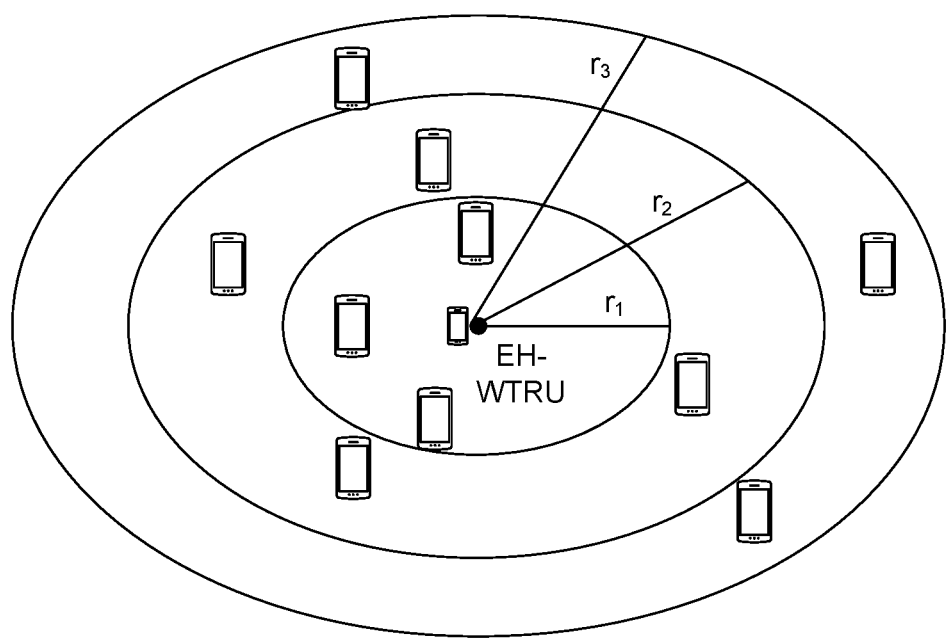
FIG. 7 is a diagram illustrating segmentation of a cell of a cellular communications network energy harvesting for purposes of energy harvesting uses.

In various embodiments, the gNB may provide assistance to the EH-WTRU by transmitting the following information to the EH-WTRU. 1) Statistics of legacy WTRU occupancy (e.g., the number of WTRUs) in each of the rings $R_1$, $R_2$, $R_3$ in FIG. 7, denoted by $a_1$, $a_2$, $a_3$ respectively. Here, ring $R_i$ denotes the area covered by the circular region whose radius is $r_i$. Although a circular area is used as an example here, one skilled in art will see that this concept can be easily extended to area covered by any arbitrary shape. 2) The union of time/frequency resources occupied by all WTRUs in each of the rings. In this example, the gNB provides $t_k \cdot f_k$ (k=1,2,3) that denotes the time and frequency resource occupancy of all legacy WTRUs in rings $R_1$, $R_2$, $R_3$ collectively.

In various embodiments, an EH WTRU behavior may be as follows.

Based on the legacy WTRU distribution information received from the gNB, the EH WTRU switches on its receive circuitry during the sub-frames/slots/symbols (i.e., $t_k$ in the notation above) based on one or more rings with the appropriate receive bandwidth ($f_k$ in the notation above) during which there are uplink transmissions. As an example, if more than 70% of WTRUs are within ring 1 ($a_1/\Sigma_i a_i$), the EH WTRU may switch on its receive circuitry based only on $t_1$ and $f_1$. In another example, 40% of WTRUs may be within $R_1$ and 60% of WTRUs may be within $R_2$, and the aggregate time schedules for WTRUs within $R_1$ and $R_2$ ($t_1$, $t_2$) are overlapping partially or completely, but the aggregate frequency resources are non-overlapping. The EH WTRU decides that the received signal strength from $R_1$ is still higher than $R_2$, but band $f_1$ is larger than $f_2$ which might result in a lower RF-to-energy conversion efficiency. The EH WTRU may then decide to switch EH circuitry between $f_1$ and $f_2$ such that the overall EH efficiency is maximized.

The EH WTRU may receive from the gNB the expected utilization of a certain band with DL transmissions, and it may or may not then decide to switch off the receive circuitry during the time units (OFDM symbols, slots, subframes, etc.) associated with downlink transmissions in order to conserve energy.

During the sub-frame/timeslots/symbols during which the schedule is 'Flexible', the EH device may, deterministically or randomly (according to some distribution), switch on or switch off its receive circuitry. This decision might be based on additional signaling from the gNB indicating the potential direction of transmissions within these time units, i.e., UL or DL, and the probability of utilization of these resources.

Beamforming Aspects

Location-Assisted EH Beam Acquisition

With regard to beamforming, a key concept in these embodiments is that the gNB signals the location information of itself, the relevant legacy WTRU (i.e., source energy WTRU), and/or the EH-WTRU, thereby enabling the EH-WTRU to estimate the optimal receive direction based on the estimated beam pair associated with the legacy WTRU-gNB uplink communication, assuming that both the EH WTRU and legacy WTRU may be equipped with multiple antennas with analog beamforming capability.

In various embodiments, the gNB operation may be scenario-dependent and may be as follows.

If the gNB knows the EH-WTRU and legacy WTRU location information and expects a Line of Sight (LoS) Uplink communication, the gNB may then use one of the following options to assist the EH WTRU in selecting its receive beam direction for energy harvesting from the legacy WTRU:

Signal to the EH-WTRU the absolute locations of the gNB, the legacy WTRU from which the EH-WTRU intends to harvest energy, and the EH-WTRU itself. The absolute location signaling could be in cartesian, polar or in any other coordinate system; or Signal relative locations of the tuple (gNB, legacy WTRU, EH WTRU). This information may be provided via a reference (e.g., gNB, legacy WTRU, or EH-WTRU location). In this case, the gNB may signal to the EH WTRU the absolute location of the reference together with the relative locations of the aforementioned tuple; or With reference to FIG. 8, the gNB could instead indicate its optimal transmit/receive beam, d, with the legacy WTRU together with the locations of the legacy WTRU and the EH-WTRU. Using d and the location of the legacy-WTRU, the EH-WTRU may estimate the optimal transmit/receive beam direction of the legacy WTRU, u. Then, using the legacy-WTRU transmit direction, u, the EH-WTRU may calculate its optimal receive beam direction f; or The gNB could also use the legacy WTRU and EH WTRU locations to indicate to the EH WTRU the angle between the EH WTRU's LoS to the legacy WTRU and the EH WTRU's LoS to the gNB. The EH WTRU can then use its multiple receive antennas to estimate the direction of arrival of the gNB's signal. When combined with the gNB indicated angle, the EH WTRU can calculate its best receive beam direction.

If the gNB knows the EH-WTRU and legacy WTRU location information but is agnostic to the directionality of the Uplink channel (e.g., does not necessarily know the beam direction), the gNB may determine the half plane that can be spanned by the legacy WTRU beam based on a single reflection assumption and signal that information to the EH WTRU along with any of the location information mentioned in the preceding bullet. The EH WTRU can then determine the optimal EH receive beam direction.

In various embodiments, the gNB may choose to limit the signaling options above to the cases where the EH WTRU is sufficiently close to the legacy WTRU to guarantee a LoS energy harvesting link. The gNB may also be assumed to be unaware of the EH WTRU location, but aware that the EH WTRU is capable of estimating its own location. In such case, the gNB may exclude the EH WTRU location information from the set of signaling options described above, and let the EH WTRU be responsible for determining whether its distance to the legacy WTRU is sufficient to warrant it performing LoS energy harvesting. Otherwise, the EH WTRU may decide to consider omnidirectional energy harvesting or use one of the receive beam determination methods described below.

Figure 8:
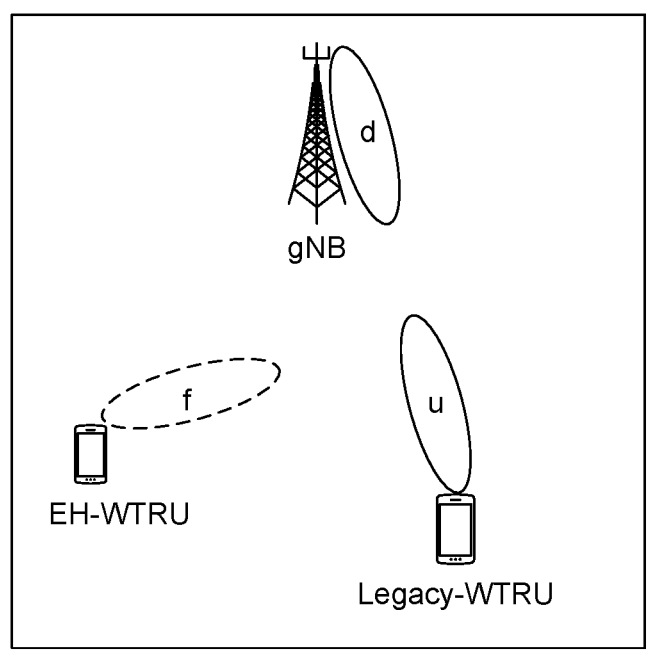
FIG. 8 is a diagram illustrating location-assisted energy harvesting beam acquisition in accordance with an embodiment.

In various embodiments, the EH-WTRU operation may be as follows. From the received location signaling, the EH-WTRU estimates the transmit/receive direction of the legacy WTRU for uplink communication with the gNB. As an example, let u, d denote the transmit and receive beams of the legacy WTRU and gNB, respectively, that the EH-WTRU estimates to be the optimal beam based on the locations of the gNB, and the legacy WTRU. This is shown in FIG. 8. For the estimated (u, d) beam directions for the legacy WTRU-gNB communication, the EH-WTRU estimates the optimal beam direction f that maximizes its energy harvesting efficiency, based on the location of the EH-WTRU and the legacy WTRU. The EH-WTRU may use the receive beam direction f to receive radio signals from the legacy WTRU for energy harvesting.

Training-Based EH Beam Acquisition

EH-WTRU Receive Beam Determination for Legacy WTRU Uplink Communication (Single User Scenario)

Figure 9:
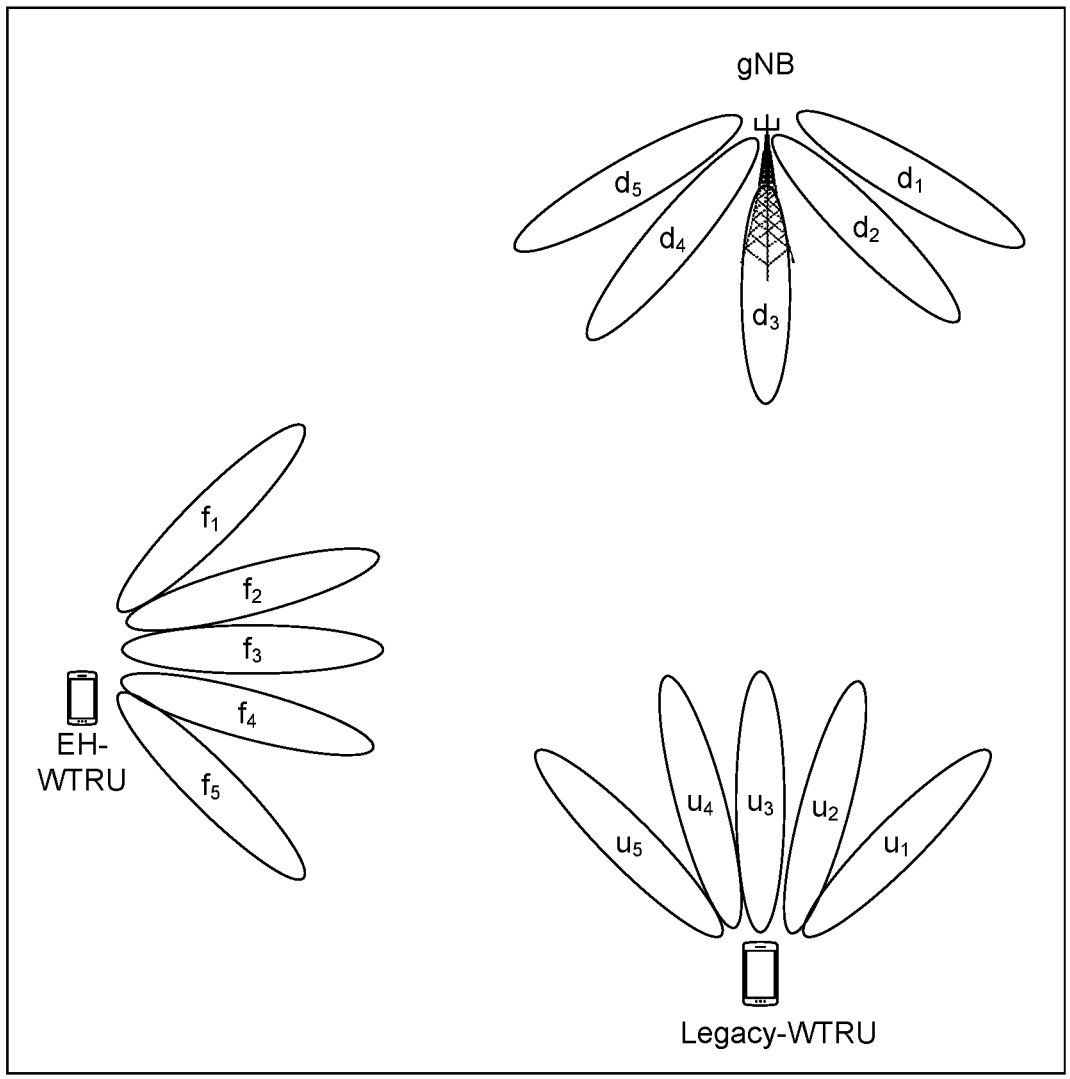
FIG. 9 is a diagram illustrating training-based energy harvesting beam acquisition for a single user scenario in accordance with an embodiment.

FIG. 9 demonstrates an embodiment in which the EH-WTRU harvests energy from a single legacy user using training-based beam acquisition techniques. In this exemplary embodiment, the gNB signals to the EH-WTRU the transmit/receive beam direction, u, of the legacy WTRU with the gNB. Based on this, the EH-WTRU may determine the best receive beam direction, f, for maximizing its energy harvesting efficiency. This process may take place in two steps as outlined below.

Step-1: EH-WTRU determining the best receive beam direction for every source energy/legacy WTRU transmit direction.

All possible transmit/receive directions are quantized into N bits and each direction is associated with transmitting a specific N bit reference signal. As an example, for a two bit scenario, the beam directions may be quantized as [−90°, −45°, 45°, 90°], with their associated reference signals being $[r_1, r_2, r_3, r_4]$ respectively, where $r_i$ represents the $i^{th}$ N bit reference signal. For instance, transmission of $r_2$ by a device would be associated to the transmit direction of −45°.

The legacy-WTRU and the EH WTRU now perform the following: the gNB causes the legacy UE to transmit a test signal in each of the potential uplink directions for communications with the gNB, while the EH UE observes each such directional transmission. For each of those transmit directions of the legacy WTRU, the EH-WTRU determines the best receive beam direction, denoted by $f_i$, in FIG. 9. At the end of this phase, the EH-WTRU is aware of the best receive direction for every possible transmit direction of the legacy WTRU transmission. An example is shown in Table 1 below.

TABLE 1

Best receive beam direction for the EH-WTRU for all possible transmit directions of the source energy WTRU/legacy WTRU

| Legacy WTRU transmit direction | EH-WTRU best receive direction |
|---|---|
| $u_1$ | $f_2$ |
| $u_2$ | $f_1$ |
| $u_3$ | $f_5$ |
| $u_4$ | $f_3$ |
| $u_5$ | $f_3$ |

Step-2: EH-WTRU determining the best receive direction for the beam pair associated with legacy WTRU-gNB uplink communication. For example, the gNB and legacy WTRU may determine the best transmit/receive direction for the legacy WTRU-gNB communication link using legacy (3GPP standardized methods). The legacy WTRU may transmit its best transmit/receive direction to the gNB, which is, in turn, signaled to the EH-WTRU by the gNB. The EH-WTRU may then determine its best receive direction ($f_i$ in Table 1) for the signaled best transmit/receive direction, $u_i$, of the legacy WTRU.

EH-WTRU Receive Beam Determination for Legacy WTRU Uplink Communications (Multi-User Scenario)

FIG. 10 illustrated an example embodiment in which the EH-WTRU harvests energy from multiple legacy WTRUs. In an example, the EH-WTRU finds the optimal receive direction for energy harvesting with respect to each of the legacy WTRUs individually. That is, Step-1 and Step-2 explained above are performed individually for legacy WTRU-1 and legacy WTRU-2 in FIG. 10. The gNB may signal the optimal transmit/receive directions of legacy WTRU-1 and legacy WTRU-2. In the example in FIG. 10, the EH-WTRU may receive the optimal transmit directions of legacy WTRU-1 and legacy WTRU-2 to be $u_1$, $u_2$, respectively, from the gNB. Let the optimal receive directions from a EH-WTRU perspective, for legacy WTRU transmit direction $u_1$ be $f_1$, and for legacy WTRU transmit direction $u_2$ be $f_2$ as shown in FIG. 10. In some cases, the EH-WTRU may determine the optimal receive direction collectively for transmit directions $u_1$ and $u_2$ to be f. Alternately, the EH-WTRU may time share between directions $f_1$ and $f_2$. That is, instead of finding the optimal receive direction, f, jointly based on $u_1$ and $u_2$, the EH-WTRU could tune its receive direction to be $f_1$ for time duration aT and direction $f_2$ for time duration (1−a)T, where T could represent symbols, group of symbols, sub-frames, frames, hyper-frames etc., and, $0 \le a \le 1$.

Though the exemplary embodiment discussed in connection with FIG. 10 comprises two legacy WTRUs, one skilled in art will understand that it is straightforward to extend this embodiment to more than two legacy WTRUs or any other type of WTRUs.

Figure 11:
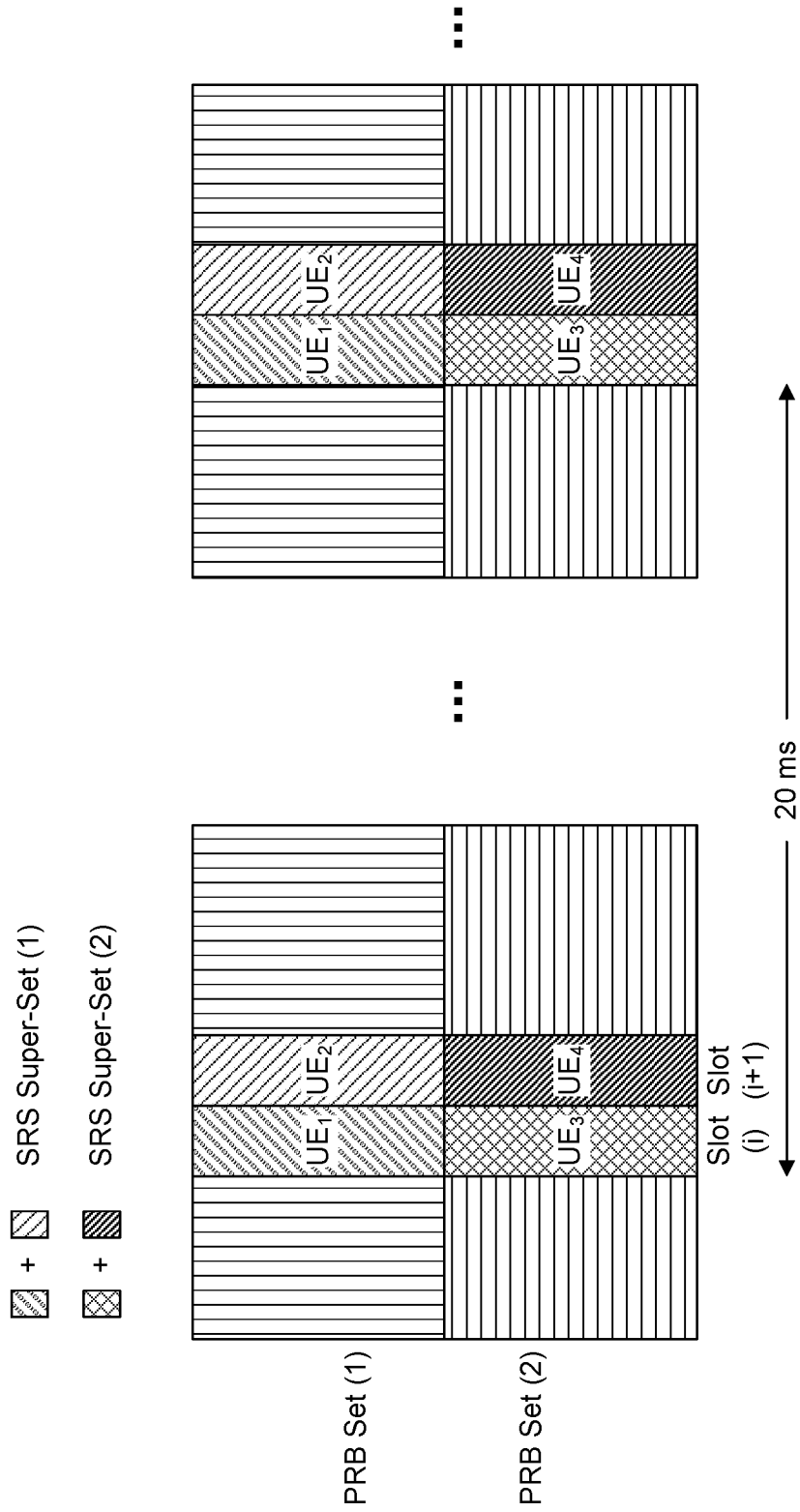
FIG. 11 is a diagram illustrating exemplary SRS supersets and PRB sets with complete overlap in frequency in accordance with an embodiment.

In various embodiments, as shown in FIG. 11, a gNB may group WTRUs based on their locations and/or prior channel condition knowledge (e.g., based on an earlier estimation of the uplink beam directions from those WTRUs or UEs to the base station/gNB) such that those WTRUs' expected channel conditions are (or at least are likely to be) comparable to each other. Then, the gNB might configure SRS scheduling for each group such that: 1) SRS resources for each WTRU in the group cover the same frequency resources, i.e., a physical resource block (PRB) set, and are combed in frequency and/or multiplexed in time, i.e., each WTRU is configured with a distinct slot offset in a periodic SRS configuration; and/or 2) SRS resources for each WTRU in the group span one or more frequency resources that are part of one or more PRB sets and are combed in frequency and/or multiplexed in time.

For instance, for the example shown in FIG. 11, the gNB may decide to assign $\{UE_1, UE_2\}$ to group (1) and $\{UE_3, UE_4\}$ to group (2). The gNB decides to schedule SRS resources for $\{UE_1, UE_2\}$ such that they span the upper half of system PRBs, have a periodicity of 20 ms, and have a single slot offset in the time domain. The combined/aggregated SRS schedules for $\{UE_1, UE_2\}$ is assigned to an SRS super-set with index (1). On the other hand, the gNB decides to schedule SRS resources for $\{UE_3, UE_4\}$ such that they span the lower half of system PRBs, have a periodicity of 20 ms, and have a single slot offset in the time domain. The combined/aggregated SRS schedules for $\{UE_3, UE_4\}$ is assigned to an SRS super-set with index (2). In this example, two PRB sets are defined where the first PRB set spans the upper half of system PRBs and the second set spans the lower half. This will allow an EH WTRU to more efficiently harvest energy from each of the two groups of WTRUs (i.e., WTRU-1 and WTRU-2 or WTRU-3 and WTRU-4).

Figure 12:
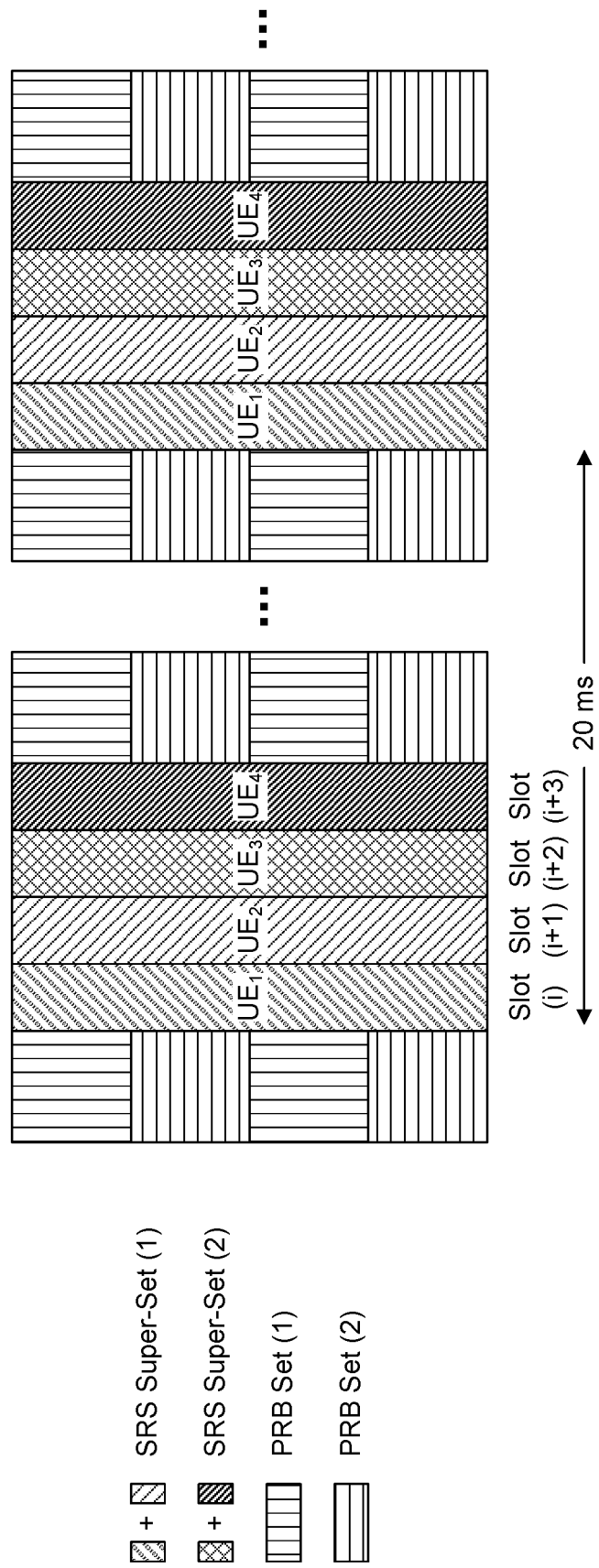
FIG. 12 is a diagram illustrating exemplary SRS supersets and PRB sets with partial overlap in frequency in accordance with an embodiment.

As another example, shown in FIG. 12, the gNB may decide to assign $\{UE_1, UE_2\}$ to group (1) and $\{UE_3, UE_4\}$ to group (2). The gNB decides to schedule SRS resources for $\{UE_1, UE_2\}$ such that they span the whole system PRBs, have a periodicity of 20 ms, and have a single slot offset in the time domain. The combined/aggregated SRS schedules for $\{UE_1, UE_2\}$ is assigned to an SRS super-set with index (1). Similarly, the gNB decides to schedule SRS resources for $\{UE_3, UE_4\}$ such that they span the whole system PRBs, have a periodicity of 20 ms, have a single slot offset in time domain with respect to each other's schedule, and have a two slot offset with respect to group (1) SRS schedule. The combined/aggregated SRS schedules for $\{UE_3, UE_4\}$ is assigned to an SRS super-set with index (2). In this example, two PRB sets are also defined where the first PRB set spans the first and third quarter of system PRBs and the second set spans the second and last quarters.

The EH-WTRU then receives the combined/aggregate SRS periodic/semi-persistent schedule, i.e., SRS super-sets (or alternatively any other combined persistent/semi-persistent transmission schedule) for WTRUs within a group of associated PRB set(s), i.e., the gNB can limit WTRUs UL data transmission schedules in a certain group to be within a certain PRB set(s) for energy harvesting purposes. The EH-WTRU can then use the received schedule for training and determining the best receive beam for each PRB set that will maximize the amount of energy harvested over that PRB set, i.e., maximize the RF-to-energy conversion efficiency. For the example shown in FIG. 11, the gNB may limit $\{UE_1, UE_2\}$ UL data transmission schedules to be within the upper half of system PRBs and $\{UE_3, UE_4\}$ UL data transmission schedules to be within the lower half. The EH WTRU uses SRS super-set 1 to train its receive beam and find the best one to be associated with PRB set 1 and uses SRS super-set 2 to train its receive beam and find the best one to be associated with PRB set 2. Similarly, in the example shown in FIG. 12, the gNB may limit $\{UE_1, UE_2\}$ UL data transmission schedules to be within the first and third quarters of system PRBs and $\{UE_3, UE_4\}$ UL data transmission schedules to be within the second and last.

Next, based on UL data traffic, the gNB may continuously update the EH-WTRU by signaling index(indices) of one or more UL data active PRB set(s) and potentially the associated aggregate time schedule over a ZE air interface. The EH-WTRU can then determine the best receive beam for energy harvesting based on the signaled PRB set(s) index (indices), i.e., mapping the received PRB set index to the trained receive beam direction, and may decide to further optimize the amount of energy harvested by limiting its harvesting band to only one of the PRB sets or a subset of PRBs within a PRB set. The gNB may further decide to include additional information about the subset of PRBs within a PRB set that will be active with UL data transmissions to optimize the RF-to-energy conversion efficiency of the EH WTRU.

Transmit Beam Agnostic EH Beam Acquisition

For embodiments in which the EH WTRU does not receive from the gNB the uplink transmit beam direction of the legacy WTRU from which it will harvest energy, the procedure for autonomous beam training by the EH-WTRU agnostic to the legacy WTRU transmit beam direction may be as follows.

For example, the gNB may provide the SRS schedule of the legacy WTRU (i.e., source energy WTRU from which the energy harvesting WTRU will harvest energy) and its location. Assume that $[t_1, t_2]$ represents the time period during which SRS would be transmitted according to a specific frequency configuration, e.g., every $N^{th}$ subcarrier within a certain band and with a specific periodic/semi-periodic/aperiodic configuration. Here $[t_1, t_2]$, could represent a group of symbols, slots, frames, hyper-frames, etc.

The EH-WTRU may tune its receive band based on the frequency domain configuration and sweeps its receive beam along multiple receive directions to determine along which direction it receives the maximum power. For example, as in FIG. 9, the EH-WTRU could sweep through $f_1$ to $f_5$ and determine in which $f_i$ it receives the maximum power. The time duration for which each receive direction will be tested for the received power quality (i.e., dwell-time) depends on the quantity, $d=t_2-t_1$, and the number of potential receive directions N. One possibility would be to have an equal time duration for every receive direction, i.e., $$\frac{d}{N}$$

to determine the receive power. In other embodiments, dwell-times for different receive directions may be unequal.

Figure 13:
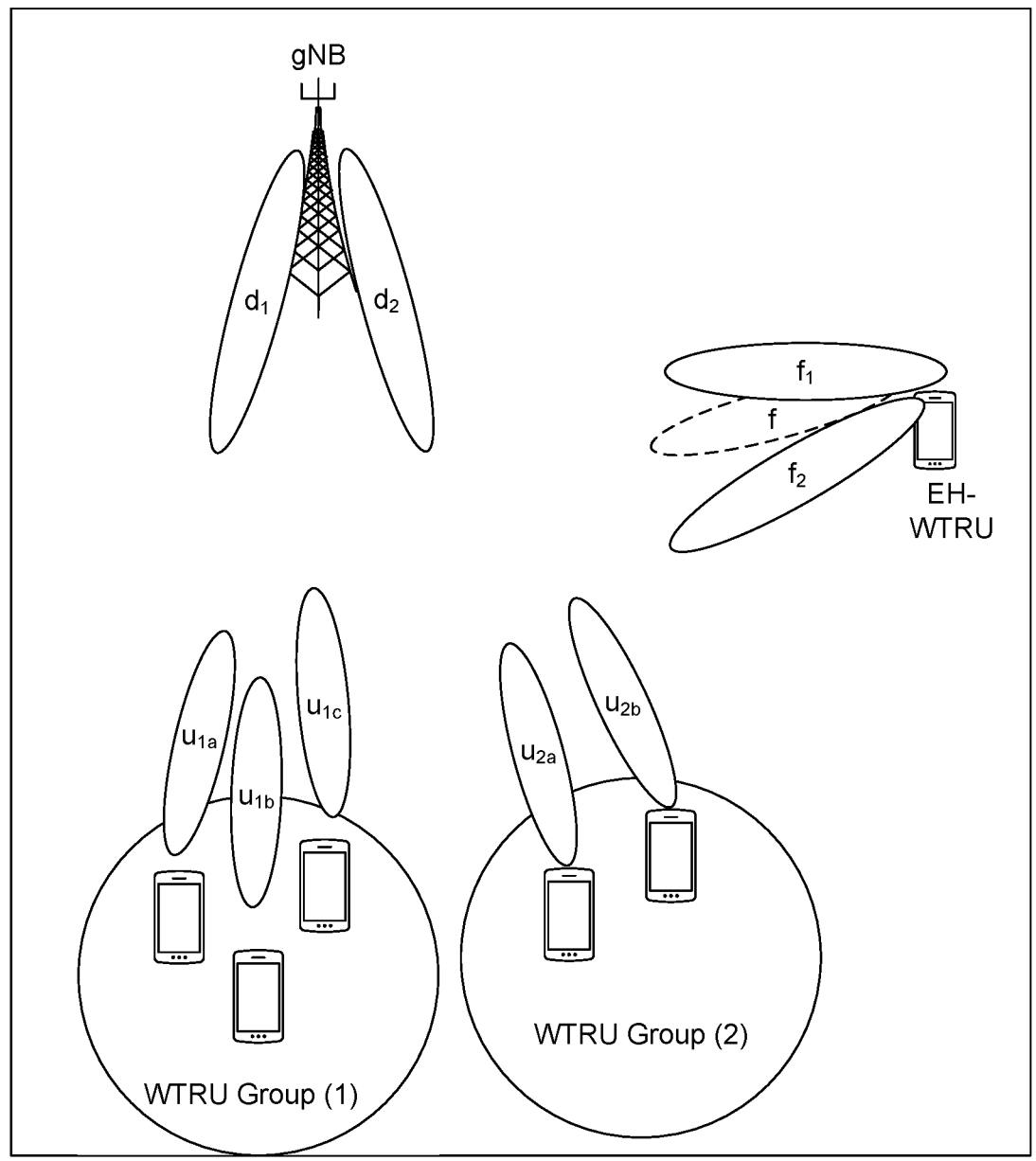
FIG. 13 is a diagram illustrating training-based energy harvesting beam acquisition for a multi-user groups scenario in accordance with an embodiment.

In the aforementioned discussion, it is assumed that the entire SRS time duration, d, is used for beam acquisition/training. However, this need not be the case. It is possible to use a fraction of this duration, $\alpha d$, for beam acquisition, where $0 \le \alpha \le 1$, and the rest $(1-\alpha)d$ for energy harvesting purposes. That is, beam acquisition/training is performed for a fraction of time to determine the best receive direction, and the determined receive direction is used subsequently for energy harvesting purposes. Note that the beam acquisition/training may be performed on regular data transmissions as well (e.g., semi-persistent scheduling intervals), such as depicted in FIG. 13.

EH-WTRU Aware Legacy WTRU Transmission Methods

In various embodiments, the legacy WTRU(s) may be aware of the presence of the EH-WTRU, and the legacy WTRU may adjust its direction of uplink transmission to a direction that is optimal for both gNB reception as well as energy harvesting for the EH-WTRU.

In one exemplary embodiment, the gNB may operate as follows. The gNB may provide the legacy WTRU location information of the EH-WTRU along with the uplink grant of the legacy WTRU as a part of the DCI. Alternately, the location information of the EH-WTRU could be provided to the legacy WTRU as part of any lower or upper layer signaling, such as RRC/MAC etc.

Figure 14:
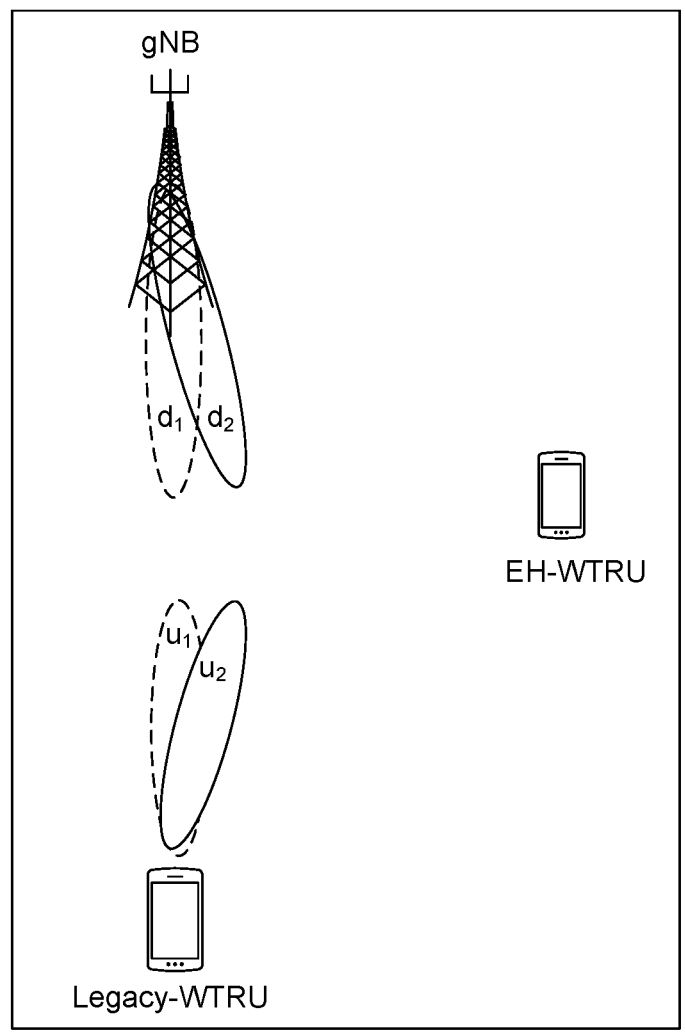
FIG. 14 is a diagram illustrating an energy harvesting embodiment in which the legacy WTRU is aware of the energy harvesting WTRU.

In various embodiments, a legacy WTRU may operate as follows. The legacy WTRU may determine one or more uplink transmitting directions to the gNB where, for example, the gNB's Reference Signal Received Power (RSRP) is greater than a threshold, THR. With reference to FIG. 14, let us assume that, for the gNB's receive direction $d_1$ (determined through legacy methods), the gNB feeds back directions $u_1$, $u_2$ to be the transmit direction of the legacy WTRU which satisfies the aforementioned threshold, THR. Without loss of generality, let us assume that transmit direction $u_1$ is better than $u_2$.

The legacy WTRU may now determine, using, for instance, the location of the EH-WTRU (or, by the pre-determined receive direction of the EH-WTRU) and any of the techniques discussed above, which of the transmit directions, $u_1$ or $u_2$ will provide the best compromise (or trade-off) between optimal gNB uplink transmission for the legacy WTRU and optimal energy harvesting for the EH-WTRU. As an example, it may be that the legacy WTRU determines that transmit direction $u_1$ is optimal solely for uplink transmission with the gNB, but that transmit direction $u_2$ offers the best compromise for both gNB uplink transmissions and EH-WTRU energy harvesting, and hence chooses transmit direction $u_2$. In yet other embodiments, one or more of the beam training-based techniques discussed herein could be used to select the optimal transmit beam direction, but would require signaling of additional information to the legacy WTRU (for example, the results of beam training exercise performed by the EH WTRU).

Concurrent Energy Harvesting from Multiple Sources

Figure 15A:
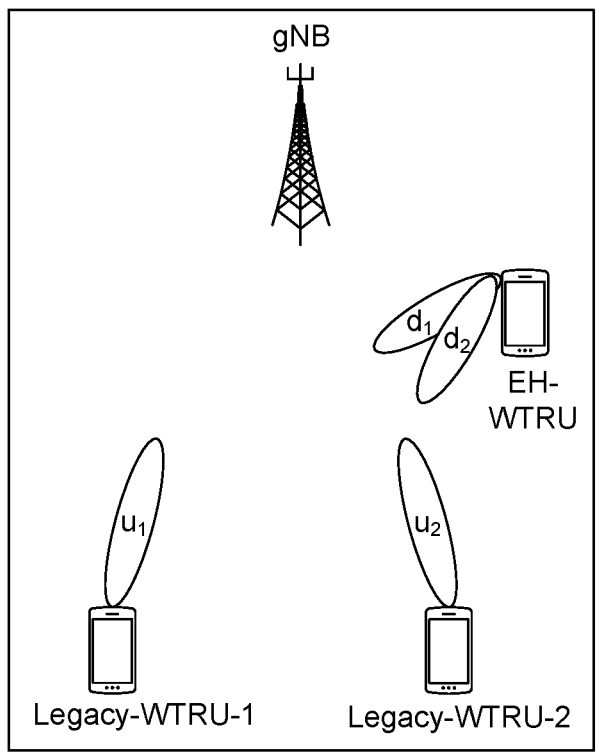
FIGS. 15A and 15B are diagrams illustrating two exemplary embodiments of an energy harvesting WTRU concurrently harvesting energy from multiple WTRUs.
Figure 15B:
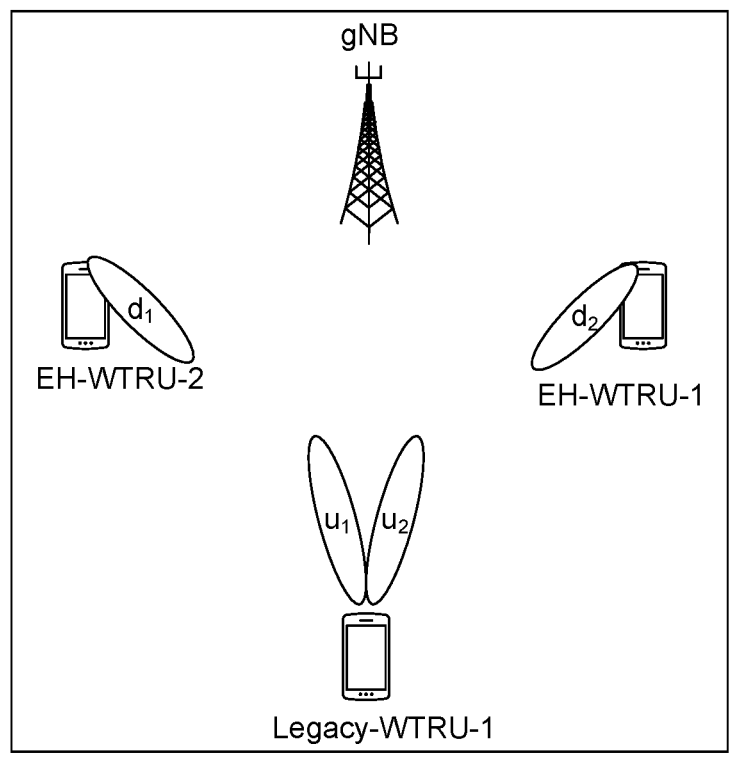

In yet other embodiments, an EH-WTRU may harvest energy from multiple receive directions (such as illustrated by FIG. 15A), or a specialized WTRU (e.g., legacy WTRU) may provide energy harvesting assistance to multiple energy harvesting WTRUs (such as illustrated by FIG. 15B).

In FIG. 15A, the gNB provides the EH-WTRU the locations of legacy WTRU-1, legacy WTRU-2, and the gNB. Alternately, the EH-WRU may be provided the transmitting directions $u_1$, $u_2$ of the legacy WTRUs, e.g., via DCI/RRC/MAC signaling from the gNB. The EH-WTRU adjusts its receive directions ($d_1$, $d_2$) jointly based on the locations of the gNB, and the legacy WTRUs or the transmitting directions of the legacy WTRUs. Alternately, the legacy WTRUs may be provided the location of the EH-WTRU, so that the transmit directions $u_1$, $u_2$ are selected by legacy WTRUs 1 and 2, respectively, based jointly on the location of the gNB (or the receive direction of the gNB) and the location of the EH-WTRU (or the receive directions $d_1$, $d_2$).

Alternately, in the example illustrated by FIG. 15B the legacy WTRU is provided with the locations of the energy harvesting WTRUs (EH-WTRU-1, EH-WTRU-2), and the legacy WTRU-1 chooses to sequentially switch its transmit direction between two different directions, $u_1$, $u_2$, based on the locations of EH-WTRU-1 and EH-WTRU-2 respectively, or the receiving directions $d_1$, $d_2$ for EH-WTRU-2 and EH-WTRU-1, respectively. Alternately, the legacy WTRU may select to use just the one of directions, $u_1$ and $u_2$ that provides the best overall energy harvesting by EH-WTRU-1 and EH-WTRU-2, collectively.

Channel-Aware EH Beam Acquisition

Digital Beamforming Aspects

Figure 16:
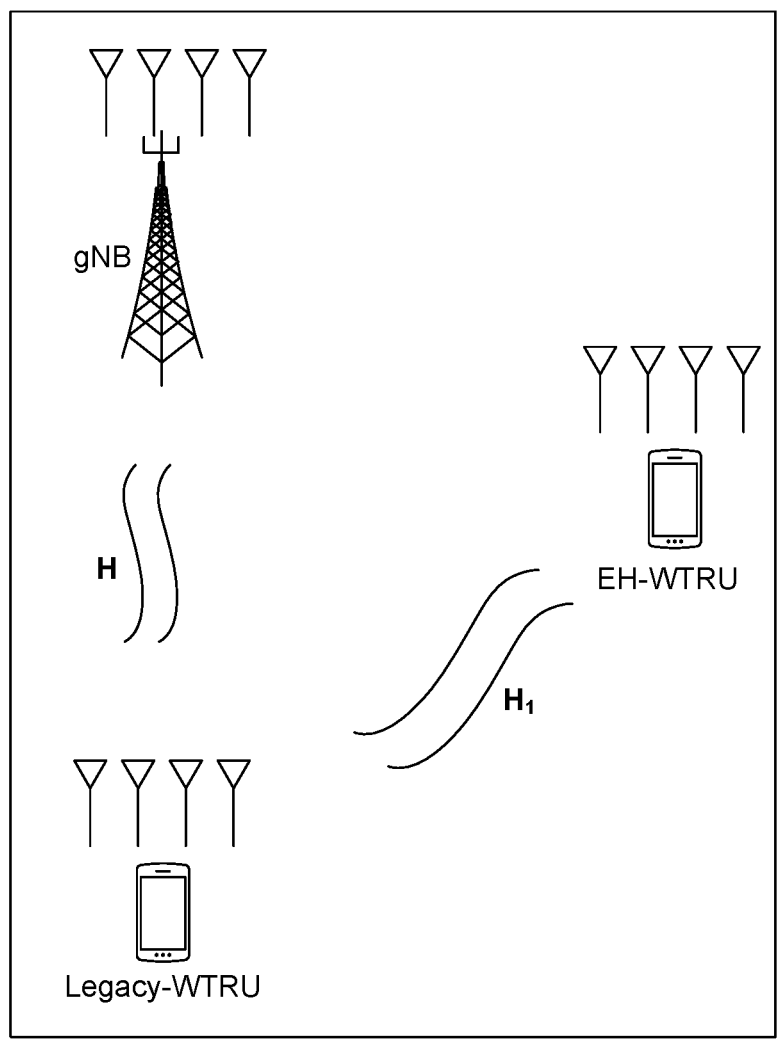
FIG. 16 is a diagram illustrating energy harvesting in accordance with an embodiment in which the energy harvesting WTRU is channel-aware.

The embodiments described hereinbelow are similar to the analog beamforming embodiments described previously, albeit in the digital domain. FIG. 16 shows an exemplary system, in which the EH-WTRU is harvesting energy from the legacy WTRU-gNB uplink transmissions. In the following embodiments, EH-WTRU may maximize its energy harvesting efficiency based on EH WTRU-legacy WTRU channel, H1 and the precoding matrix used by the legacy WTRU for its uplink transmission to the gNB.

As shown in FIG. 16, H is the uplink channel between the legacy WTRU and the gNB, while H1 is the sidelink channel between the legacy WTRU and the EH-WTRU. The selection of the optimal receive direction by the EH-WTRU proceeds according to the following steps.

Optimal precoder selection by the legacy WTRU. The uplink channel H can be measured by the gNB using legacy methods (e.g., SRS transmitted by the legacy WTRU), and the gNB may signal to the legacy WTRU the optimal precoding matrix $\tilde{H}$ to be be used by the legacy WTRU for purposes of uplink communications from the legacy WTRU to the gNB. The optimal precoding matrix $\tilde{H}$ also may be signaled to the EH-WTRU. For example, $\tilde{H}$ may be signaled concurrently to the legacy WTRU and the EH-WTRU using common/group signaling mechanisms (e.g., GRNTI).

Sidelink channel measurement by the EH-WTRU. The method whereby the EH-WTRU estimates the sidelink channel $H_1$ between itself and the legacy-WTRU may be as follows: One or more of the cell common SRS configurations including srs-BandwidthConfig IE, srs-SubframeConfig IE, pSRS-offset IE as well as one or more of the cell dedicated SRS configurations including srs-Bandwidth IE, transmissionComb IE, $T_{SRS}$ that is used for the purpose of legacy WTRU channel estimation/quality may be signaled to the EH-WTRU ($T_{SRS}$ refers to the SRS periodicity and is inferable from IE srs-ConfigIndex). The device-specific SRS configuration for the purpose of estimating UL channel quality is also signaled to the EH-WTRU using one or more of the following pieces of information in IE soundingRS-UL-ConfigDedicated: srs-ConfigIndex, cyclicShift, transmissionComb, freqDomainPosition, srs-HoppingBandwidth, srsDuration, that the gNB uses for legacy WTRU. This enables the EH-WTRU to listen to the SRS transmitted by the legacy WTRU using the signaled SRS configuration and perform channel estimation of channel H1.

With this information the EH-WTRU may determine the optimal receive direction based on the signaled precoding matrix $\tilde{H}$ (used by the legacy-WTRU) and the estimated sidelink channel, $H_1$.

Control Signaling Aspects

Signaling to Assist EH Beam Acquisition

Figure 17:
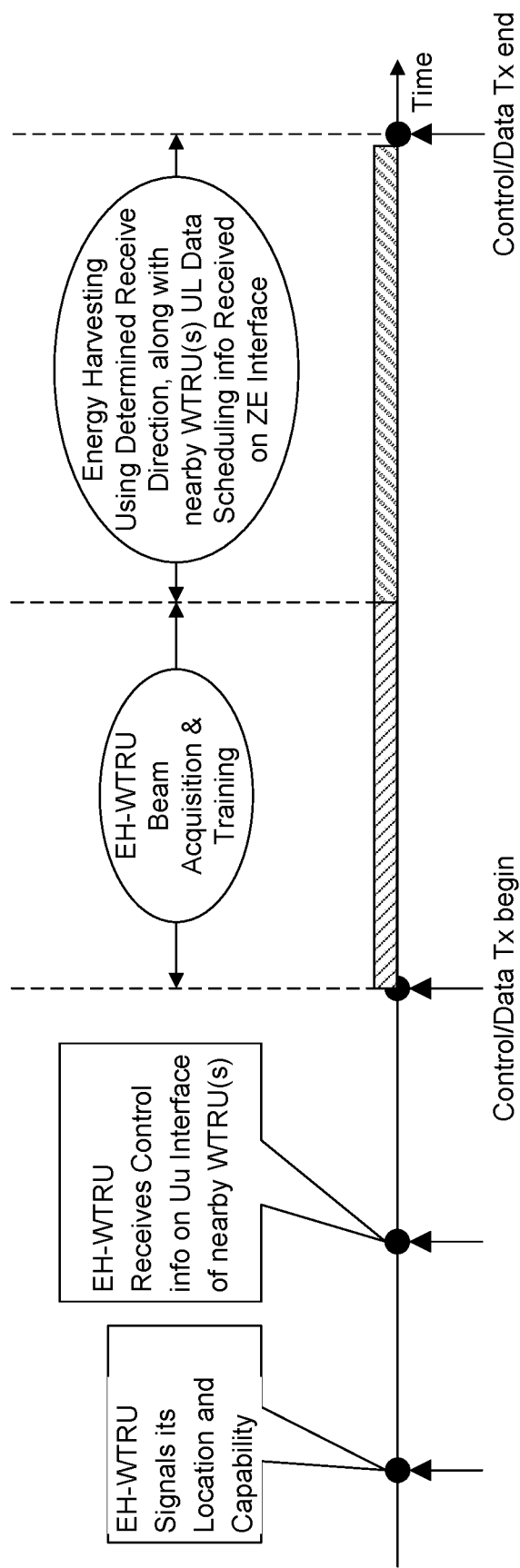
FIG. 17 is a timing diagram illustrating autonomous beam acquisition and energy harvesting in accordance with an embodiment.

FIG. 17 illustrates one exemplary timeline of events for location-assisted autonomous EH beam acquisition.

In various embodiments, the purpose of control signaling for EH beam acquisition assistance is to minimize the acquisition time of the receive beam that will maximize energy harvesting efficiency and, consequently, maximize the duration over which efficient energy harvesting occurs. Some options associated with each of the steps in a gNB/network-assisted EH beam acquisition leading to efficient energy harvesting may include any of the following:

The EH-WTRU may estimate its location and provide it to the gNB or the gNB may estimate the EH-WTRU location directly. The gNB may then determine whether suitable legacy WTRU(s) is/are in its geographical vicinity. The EH-WTRU can also signal to the gNB one or more parameter(s) associated with its energy harvesting capabilities.

Based on the information signaled from the EH-WTRU, the gNB may select one or more legacy WTRU(s) as potential energy transfer candidates for that EH-WTRU. The gNB may then signal to the EH-WTRU information regarding one or more of the following parameters:

Exact or approximate location of the selected legacy WTRU(s), e.g., the average/geometric center (or any other representative value) of the WTRUs locations;

The receive beam direction associated with each WTRU or a representative collective average direction of these beams;

The exact location of the gNB or another reference point in the cell;

Information about the characteristics of the link between the gNB and served WTRU(s), e.g., distance, line-of-sight conditions, etc.

The gNB may decide to cluster legacy WTRUs under its coverage into groups (e.g., based on their location and/or channel conditions history). The gNB may then send the EH WTRU SRS super-set(s) schedule(s) for each group and the associated PRB set(s). The EH WTRU may then train its receive beams according to the received SRS super-set schedule(s) and assign a best beam to each PRB set.

The EH-WTRU may determine the appropriate/best EH receive direction through either:
  (i) exhaustive beam sweeping over the whole space; or
  (ii) fast beam-selection over a confined/limited space based on the signaled information from the gNB, e.g., location of the legacy WTRU/transmitting direction of legacy WTRU/angle of arrival of the legacy WTRU transmission at the gNB, etc.

The EH-WTRU may utilize the receive direction (determined from the above steps) to perform energy harvesting for a period of time based on any one or more of:
  (i) dynamic control information received on the ZE air-interface (secondary air-interface), such as frequency/time resources, duration of energy harvesting, etc. (e.g., as explained below); or
  (ii) the remaining duration scheduled by the gNB; or
  (iii) until the harvested power falls below a signaled/pre-configured threshold.
  (iii) receive beam selection based on direct mapping from control/signaled information received over the ZE air interface in the form of the scheduled PRB set(s)/subset(s) index(indices) and/or the associated SRS super-set(s).

Figure 18:
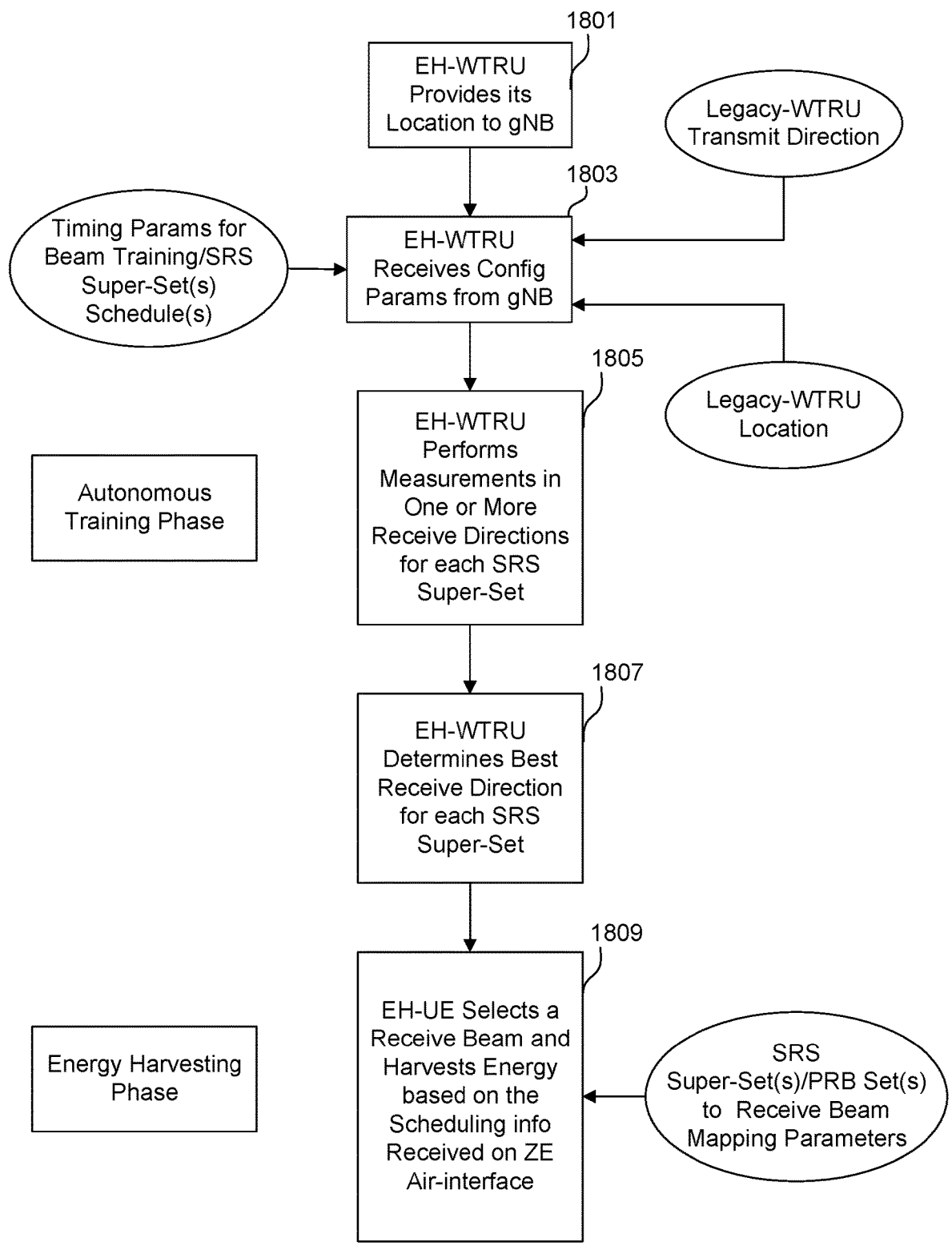
FIG. 18 is a flow diagram illustrating signaling to assist with energy harvesting beam acquisition in accordance with an embodiment.

One potential procedure is depicted as a flowchart in FIG. 18. At 1801, the EH WTRU signals its location to the gNB. At 1803, the EH WTRU receives from the gNB the various configuration parameters for beam training and energy harvesting, which may include timing parameters for beam training and the aforementioned SRS super-Set(s) schedules, the uplink transmit directions of the legacy WTRU(s) and the location(s) of the legacy WTRU(s). At 1805, the training phase begins with the EH WTRU performing measurements to be used for the next step (1807) of determining the best receive direction to use for energy harvesting. At 1809, the energy harvesting commences based on the scheduling information and SRS Super-Set(s)/PRB Set(s) index(indices) and any mapping parameters.

Low Energy Signaling Over ZE Air Interface

In various embodiments, additional details on exemplary signaling methods that may be used over a secondary air interface, Zero Energy (ZE) air interface, are provided. These exemplary signaling methods may be used to initiate or dynamically configure EH-UE energy harvesting capabilities.

Figure 19:
FIG. 19 is a diagram illustrating a wake up signal including energy harvesting and timing information in accordance with an embodiment.

For example, the gNB may provide control signaling over the ZE air interface to help the EH-WTRU select the appropriate frequency/time resource elements for energy harvesting. In particular, the available PRBs can be split into multiple PRB sets (optionally, subsets also may be defined) and the gNB may signal the appropriate PRB set(s)/subset(s). For illustration, consider the example where the available PRBs are split into 8 PRB sets (3 bits required to signal it). Further 2 bits can be considered for representing the time schedule for energy harvesting (e.g., 00=next frame; 01=next hyper-frame, 10=next super hyper-frame, 11=next symbol). This particular example is shown in FIG. 19, where the gNB can signal appropriate PRB set(s)/subset(s) and the time slot for harvesting by indicating them as part of the wake-up signal. The gNB may include other information, such as the duration of energy harvesting and/or the periodicity of transmission within a specific period.

As indicated above, the time-frequency information required for energy harvesting can be explicitly signaled over the ZE air interface using a known format. Alternatively, part of the information can be embedded in the wake-up sequence, a preamble preceding the wake-up sequence, or as part of another energy harvesting signal transmitted by the gNB. Although 3 and 2 bits have been allocated for the frequency/time information in FIG. 19 as an example, one skilled in art may see that it can be extended to any number of bits.

As mentioned earlier, the EH-WTRU can provide its ZE air interface reception capability/configuration to the gNB over the legacy Uu air interface, and the gNB can then use those configurations to initiate an energy transfer to the EH-WTRU by signaling appropriate time/frequency resources for energy harvesting based on its capability. Alternately, when the uplink scheduling information changes dynamically or semi-statically (e.g., semi-persistent scheduling), the gNB can signal the appropriate time/frequency resources (e.g., using 3 bits for resource pools and 2 bits for time, as explained above) to dynamically configure the EH-WTRU over the ZE interface.

The EH-WTRU, upon receiving the updated time/frequency information, may tune to the appropriate band. In addition to the time/frequency information above, there could be another information element, 'duration', having n≥0 bits to signify the duration for which the EH-WTRU needs to use the specified time/frequency information for energy harvesting.

In various embodiments, the gNB may also provide control signaling over the ZE air interface to help the EH-WTRU train and select the appropriate receive beam for energy harvesting, specifically, SRS Super-Set(s) schedules, the associated PRB Set(s), and mapping parameters from the SRS Super-Set(s)/PRB Set(s) to the optimal receive beam direction.

In various embodiments, a method implemented in a WTRU for harvesting energy from uplink transmissions of other WTRUs in a wireless communication network may include receiving scheduling patterns transmitted by a base station for one or more other WTRUs, inferring one or more uplink transmission patterns of the one or more other WTRUs from the scheduling patterns, turning on a receiver at the WTRU during the periods that the one or more other WTRUs will be transmitting to the base station, and harvesting energy from the transmissions of the one or more other WTRUs.

In various embodiments, a scheduling pattern may be a cell-specific scheduling pattern. The scheduling pattern may comprise a slot format indication (SFI) transmitted by the base station to the one or more other WTRUs.

In various embodiments, the WTRU may be configured to the receive scheduling patterns, from the base station, via a WTRU-dedicated control message over a Physical Downlink Control Channel (PDCCH) including information as to time and frequency resources reserved to the other WTRUs for uplink transmission to the base station.

In various embodiments, the one or more other WTRUs may comprise multiple WTRUs, and the WTRU may be configured to receive signaling that indicates SRS time/frequency resources of the multiple other WTRUs. In an example, the WTRU may be configured to devise a schedule for turning on the receiver at the WTRU for purposes of harvesting energy from said SRS signals, and the schedule is devised as a function of an aggregate of the SRS time/frequency resources of the multiple other WTRUs.

In various embodiments, the WTRU may be configured to receive, from the base station, message(s) including configurations/indications, disclosing/indicating the locations of the other WTRUs, groupings of the other WTRUs by sub-geographical areas within a cell, and unions of time/frequency resources occupied by each grouping of WTRUs.

In various embodiments, the WTRU may be configured to estimate, from the location data, an uplink beam direction between each of the other WTRUs and the base station, and for each estimated uplink beam direction, determine an optimal receive beam direction for the WTRU for harvesting energy from a beamformed uplink transmit beam using that estimated uplink beam direction, and beamform at least one receive beam according to the determined optimal beam direction.

In various embodiments, a method implemented in a base station of a wireless communications network for assisting an energy-harvesting-capable WTRU with harvesting energy from uplink transmission of other WTRUs may include: transmitting, to the energy-harvesting-capable WTRU, data disclosing the locations of other WTRUs serviced by the base station and the union of time/frequency resources occupied by the other WTRUs.

In various embodiments, the data transmitted to the energy-harvesting-WTRU discloses groupings of the other WTRUs by sub-geographical areas within a cell and unions of time/frequency resources occupied by each grouping of WTRUs.

In various embodiments, a method implemented in a base station of a wireless communications network for assisting an energy-harvesting-capable WTRU with harvesting energy from uplink transmission of at least one other WTRU and beamforming to optimize energy harvesting efficiency, the method may include: determining the locations of the base station, the at least one other WTRU, and the energy-harvesting-capable WTRU; and transmitting to the energy-harvesting-capable WTRU at least one of (a) the locations of the base station, the at least one other WTRU, and the energy-harvesting-capable WTRU, (b) the base station's optimal beam direction for communicating with the at least one other WTRU and the locations of the at least one other WTRU and the energy-harvesting-capable WTRU, (c) a line of sight (LoS) angle between the energy-harvesting-capable WTRU and the at least one other WTRU and a line of sight (LoS) angle between the energy-harvesting-capable WTRU and the base station; and (d) for each of the other WTRUs, a half plane that can be spanned by uplink beamformed transmissions by the other WTRU to the base station based on a single reflection assumption.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B". Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to", "at least", "greater than", "less than", and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112(f)or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112(f), and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WRTU), user equipment (UE), terminal, base station, Mobility Management Entity (MME) or Evolved Packet Core (EPC), or any host computer. The WRTU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Each of the following references are incorporated by reference herein: [1] PCT Patent Application No. PCT/US18/63320, [2] U.S. Provisional Patent Application No. 62/780,639, and [3] U.S. Provisional Patent Application No. 62/849,640.

What is claimed is:

1. A method implemented in a wireless transmit/receive unit (WTRU) for wireless communications, the method comprising:
   receiving one or more aggregations of sounding reference signal (SRS) schedules, wherein an aggregation of SRS schedules is associated with a group of other WTRUs;
   performing measurements of uplink transmissions of at least one other WTRU from the group of other WTRUs using the one or more aggregations of SRS schedules;
   determining a receive beam of the WTRU, for the one or more aggregation of SRS schedules, to be used for energy harvesting based on the measurements of uplink transmissions; and
   harvesting radio frequency energy from an uplink transmission of the at least one other WTRU from the group of other WTRUs using the determined receive beam.

2. The method of claim 1, wherein the receiving of the one or more aggregations of SRS schedules is based on the WTRU sending a message indicating one or more of a location of the WTRU, an energy harvesting capability of the WTRU, or a plurality of resources of the WTRU.

3. The method of claim 1, wherein the receiving of the one or more aggregations of SRS schedules comprises receiving one or more SRS super-sets including receiving indications of uplink transmit directions and locations of the least one other WTRU from the group of other WTRUs.

4. The method of claim 1, wherein the receiving of the one or more aggregations of SRS schedules further comprises receiving an indication of an aggregation of SRS time/frequency resource sets of a respective group of the group of other WTRUs.

5. The method of claim 1, wherein the determining of the receive beam of the WTRU to be used for energy harvesting comprises at least one of:
   selecting the receive beam over which a maximum receive power is detected; or
   determining the receive beam to receive an uplink transmission from the at least one other WTRU from the group of other WTRUs.

6. The method of claim 1, further comprising:
   receiving one or more uplink transmission patterns of the group of other WTRUs; and
   selecting at least one receive beam of the WTRU from a set of receive beams based on the received one or more uplink transmission patterns.

7. The method of claim 6, wherein an uplink transmission pattern comprises a list or index indicating any of at least one set of resources associated with a respective aggregation of SRS schedules, a transmission time duration, a start of a transmission, or a transmission offset.

8. The method of claim 1, further comprising:
   determining time resources for the one or more aggregations of SRS schedules;
   utilizing the one or more aggregations of SRS schedules for training in a first portion of the time resources; and
   utilizing the one or more aggregations of SRS schedules for energy harvesting in a second portion of the time resources.

9. A wireless transmit/receive unit (WTRU) comprising circuitry, including a transmitter, a receiver, a processor, and memory, the WTRU configured to:
   receive one or more aggregations of sounding reference signal (SRS) schedules, wherein an aggregation of SRS schedules is associated with a group of other WTRUs;
   perform measurements of uplink transmissions of at least one other WTRU from the group of other WTRUs using the one or more aggregations of SRS schedules;
   determine a receive beam of the WTRU, for the one or more aggregations of SRS schedules, to be used for energy harvesting based on the measurements of uplink transmissions; and harvest radio frequency energy from an uplink transmission of the at least one other WTRU from the group of other WTRUs using the determined receive beam.

10. The WTRU of claim 9, wherein the WTRU receives the one or more aggregations of SRS schedules based on the WTRU sending a message indicating one or more of a location of the WTRU, an energy harvesting capability of the WTRU, or a plurality of resources of the WTRU.

11. The WTRU of claim 9, wherein the WTRU is configured to: receive one or more aggregations of SRS schedules including uplink transmit directions and locations of the least one other WTRU from the group of other WTRUs.

12. The WTRU of claim 9, wherein the WTRU is configured to:
receive the one or more aggregations of SRS schedules by further receiving an indication of an aggregation of SRS time/frequency resource sets of a respective group of the group of other WTRUs.

13. The WTRU of claim 9, wherein the WTRU is configured to determine the receive beam of the WTRU to be used for energy harvesting by at least one of selection of a receive beam direction over which a maximum receive power is detected, or determination of the receive beam to receive an uplink transmission from the at least one other WTRU from the group of other WTRUs.

14. The WTRU of claim 9, wherein the WTRU is further configured to:
receive one or more uplink transmission patterns of the group of other WTRUs; and
select at least one receive beam of the WTRU from a set of receive beams based on the received one or more uplink transmission patterns.

15. The WTRU of claim 14, wherein an uplink transmission pattern comprises a list or index indicating any of at least one set of resources associated with a respective one of the aggregations of SRS schedules, a transmission time duration, a start of a transmission, or a transmission offset.

16. The WTRU of claim 9, wherein the WTRU is further configured to:
determine time resources for the one or more aggregations of SRS schedules;
utilize the one or more aggregations of SRS schedules for training in a first portion of the time resources; and
utilize the one or more aggregations of SRS schedules for energy harvesting in a second portion of the time resources.

17. A non-transient computer-readable storage medium comprising instructions which when executed by a wireless transmit/receive unit (WTRU) cause the WTRU to carry out a method of:
receiving one or more aggregations of sounding reference signal (SRS) schedules, wherein an aggregation of SRS schedules is associated with a group of other WTRUs;
performing measurements of uplink transmissions of at least one other WTRU from the group of other WTRUs using the one or more aggregations of SRS schedules;
determining a receive beam of the WTRU, for the one or more aggregations of SRS schedules, to be used for energy harvesting based on the measurements of uplink transmissions; and
harvesting radio frequency energy from an uplink transmission of the at least one other WTRU from the group of other WTRUs using the determined receive beam.

18. The non-transient computer-readable storage medium of claim 17, wherein the receiving of the one or more aggregations of SRS schedules is based on the WTRU sending a message indicating one or more of a location of the WTRU, an energy harvesting capability of the WTRU, or a plurality of resources of the WTRU.

19. The non-transient computer-readable storage medium of claim 17, wherein the receiving of the one or more aggregations of SRS schedules further comprises receiving an indication of an aggregation of SRS time/frequency resource sets of a respective group of the group of other WTRUs.

20. The non-transient computer-readable storage medium of claim 17, wherein the determining of the receive beam of the WTRU to be used for energy harvesting comprises at least one of:
selecting the receive beam over which a maximum receive power is detected; or
determining the receive beam to receive an uplink transmission from the at least one other WTRU from the group of other WTRUs.

* * * * *